(12) United States Patent
Kusukame et al.

(10) Patent No.: US 8,125,703 B2
(45) Date of Patent: Feb. 28, 2012

(54) WAVELENGTH CONVERTER AND IMAGE DISPLAY WITH WAVELENGTH CONVERTER

(75) Inventors: Koichi Kusukame, Osaka (JP); Kiminori Mizuuchi, Osaka (JP); Tetsuro Mizushima, Osaka (JP); Shinichi Shikii, Nara (JP); Hiroyuki Furuya, Nara (JP); Kazuhisa Yamamoto, Osaka (JP); Shinichi Kadowaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/532,184

(22) PCT Filed: Mar. 19, 2008

(86) PCT No.: PCT/JP2008/000651
§ 371 (c)(1),
(2), (4) Date: Sep. 21, 2009

(87) PCT Pub. No.: WO2008/114512
PCT Pub. Date: Sep. 25, 2008

(65) Prior Publication Data
US 2010/0085631 A1    Apr. 8, 2010

(30) Foreign Application Priority Data

Mar. 22, 2007 (JP) ................................. 2007-074177
Jun. 21, 2007 (JP) ................................. 2007-163493

(51) Int. Cl.
*G02F 1/37* (2006.01)
*G02F 1/35* (2006.01)
(52) U.S. Cl. ........................... 359/328; 359/326; 372/22
(58) Field of Classification Search .......... 359/326–332; 372/21–22
See application file for complete search history.

(56) References Cited

U.S. PATENT DOCUMENTS

| 5,321,718 A | * | 6/1994 | Waarts et al. | ................ 372/108 |
| 5,359,452 A |  | 10/1994 | Nitanda et al. | |
| 5,415,743 A | * | 5/1995 | Harada | ......................... 427/466 |

(Continued)

FOREIGN PATENT DOCUMENTS

JP    3-33096    2/1991

(Continued)

OTHER PUBLICATIONS

International Search Report issued May 1, 2008 in International (PCT) Application No. PCT/JP2008/000651.

(Continued)

*Primary Examiner* — Daniel Petkovsek
(74) *Attorney, Agent, or Firm* — Wenderoth, Lind & Ponack, L.L.P.

(57) ABSTRACT

Upon obtaining green light as wavelength converted light by causing infrared light to be incident on a wavelength conversion element, the absorption of the green light occurs due to the generation of ultraviolet light as sum-frequency light of the infrared light and the green light in the wavelength conversion element and the destruction of a crystal composing the wavelength conversion element occurs due to heat generated at this time. In a laser wavelength converter of the present invention, a condensed position of the infrared light in the wavelength conversion element is deviated from a position assumed to be optimal when the influence of the generated heat is ignored. Consequently, crystal destruction is suppressed, a high-efficiency wavelength conversion is enabled and high-output wavelength converted light exceeding several watts, which was difficult to attain in conventional wavelength conversion elements, is attained.

24 Claims, 25 Drawing Sheets

U.S. PATENT DOCUMENTS

| | | |
|---|---|---|
| 5,568,308 A | 10/1996 | Harada |
| 5,592,326 A * | 1/1997 | Taira ............................ 359/326 |
| 5,963,359 A | 10/1999 | Shinozaki et al. |
| 6,775,307 B2 * | 8/2004 | Hatori ............................ 372/22 |
| 6,944,194 B1 * | 9/2005 | Hatori et al. .................... 372/21 |
| 7,769,061 B2 * | 8/2010 | Kamijima ....................... 372/22 |

FOREIGN PATENT DOCUMENTS

| | | |
|---|---|---|
| JP | 5-249518 | 9/1993 |
| JP | 5-289137 | 11/1993 |
| JP | 6-16500 | 1/1994 |
| JP | 6-242478 | 9/1994 |
| JP | 11-271823 | 10/1999 |
| JP | 11-295771 | 10/1999 |
| JP | 2000-250083 | 9/2000 |
| JP | 2002-72266 | 3/2002 |
| JP | 2002-122898 | 4/2002 |
| JP | 2003-267798 | 9/2003 |
| JP | 2003-267799 | 9/2003 |
| JP | 2004-53781 | 2/2004 |
| JP | 2004-125943 | 4/2004 |
| JP | 2005-331993 | 12/2005 |
| JP | 2006-19603 | 1/2006 |
| JP | 2006-330661 | 12/2006 |

OTHER PUBLICATIONS

D. A. Bryan et al., "Increased optical damage resistance in lithium niobate", Applied Physics letters, 44, 9, 847-849 (1984).

D. H. Jundt et al., "Periodically poled $LiNbO_3$ for high-efficiency second-harmonic generation", Applied Physics letters, 59, 21, 2657-2659 (1991).

* cited by examiner

WAVELENGTH CONVERTER AND IMAGE DISPLAY WITH WAVELENGTH CONVERTER

FIELD OF THE INVENTION

The present invention relates to a laser wavelength converter using a wavelength conversion element composed of a nonlinear optical single crystal.

BACKGROUND OF THE INVENTION

Attention has been attracted to high-output laser light sources with outputs exceeding several W as light sources used for laser processing or laser displays. Semiconductor lasers using gallium arsenide, gallium nitride and the like have been developed in red and blue regions and it has been also studied to realize higher outputs. However, it is still difficult to directly generate green laser light from a semiconductor.

Thus, a method for obtaining green light as a second harmonic by wavelength converting infrared light or the like as a fund amental wave has been generally employed. Specifically, infrared light emitted from a solid-state laser such as a YAG laser or a fiber laser using a fiber doped with a rare-earth element such as Yb or Nd is caused to be incident on a nonlinear optical crystal and green light is obtained by wavelength conversion by the nonlinear optical crystal.

Particularly, a wavelength conversion element formed with a quasi phase matching (QPM) structure using a polarization reversal technology for lithium niobate or lithium tantalate is known to have a large nonlinear optical constant and to be able to obtain green light from infrared light with a high conversion efficiency. Further, by doping a wavelength conversion element with magnesium oxide, it became possible to suppress a change in refractive index (photorefractive) caused by light, which is one of crystal degradations and enable a stable wavelength conversion at ordinary temperatures as disclosed in Non-Patent Literatures 1, 2.

In the case of causing infrared light as a fundamental wave to be incident to generate green light as a second harmonic in a wavelength conversion element composed of lithium niobate doped with magnesium oxide, it is problematic that crystal destruction starts in the second half of a beam path upon generating an output exceeding 2 W although it differs depending on the element. In the case of pulse oscillation with a high peak value, crystal destruction occurs when an average output exceeds 0.5 W.

In a wavelength conversion element composed of lithium tantalate, crystal destruction that occurs at the time of a high output is similarly problematic.

Here, it can be thought to use a plurality of wavelength conversion elements as disclosed in Patent Literature 1 or form a plurality of optical paths in one wavelength conversion element as disclosed in Patent Literature 2, for example, in order to obtain a harmonic with a high output of 5 W. However, regardless of which construction is employed, a green output which can be generated from one optical path is at most 2 W if crystal destruction is considered. Thus, three wavelength conversion elements or optical paths are necessary.

Patent Literature 1: Japanese Unexamined Patent Publication No. H11-271823
Patent Literature 2: Japanese Unexamined Patent Publication No. 2004-125943
Non-Patent Literature 1: Applied Physics letters, 44, 9, 847-849 (1984)
Non-Patent Literature 2: Applied Physics letters, 59, 21, 2657-2659 (1991)

DISCLOSURE OF THE INVENTION

In view of the above problems, an object of the present invention is to provide a laser wavelength converter and an image display capable of obtaining a harmonic while suppressing the crystal destruction of a wavelength conversion element.

One aspect of the present invention is directed to a laser wavelength converter, comprising a laser light source for emitting laser light; and a wavelength conversion element for wavelength converting laser light from the laser light source, wherein the wavelength conversion element has an optimal condensing condition for maximizing a conversion efficiency for the laser light; and the laser light is so incident on the wavelength conversion element as to attain a reduced condensing condition on which the conversion efficiency is reduced from that on the optimal condensing condition.

Another aspect of the present invention is directed to an image display, comprising a plurality of laser light sources; and an optical system for forming an image on a screen using the plurality of laser light sources, wherein the plurality of laser light sources include at least a red laser light source for emitting a red light beam, a green laser light source for emitting a green light beam and a blue laser light source for emitting a blue light beam; and at least the green one of the respective laser light sources includes the above laser wavelength converter.

Still another aspect of the present invention is directed to an image display, comprising a liquid crystal display panel; and a backlight lighting device for lighting the liquid crystal display panel from behind, wherein the backlight lighting device includes at least a red laser light source for emitting a red light beam, a green laser light source for emitting a green light beam and a blue laser light source for emitting a blue light beam; and at least the green one of the respective laser light sources includes the above laser wavelength converter.

According to the present invention, a harmonic can be obtained while the crystal destruction of a wavelength conversion element is suppressed.

BEST MODES FOR EMBODYING THE INVENTION

Hereinafter, embodiments of the present invention are described with reference to the accompanying drawings. The following embodiments are specific examples of the present invention and not of the nature to limit the technical scope of the present invention.

Figure 1:
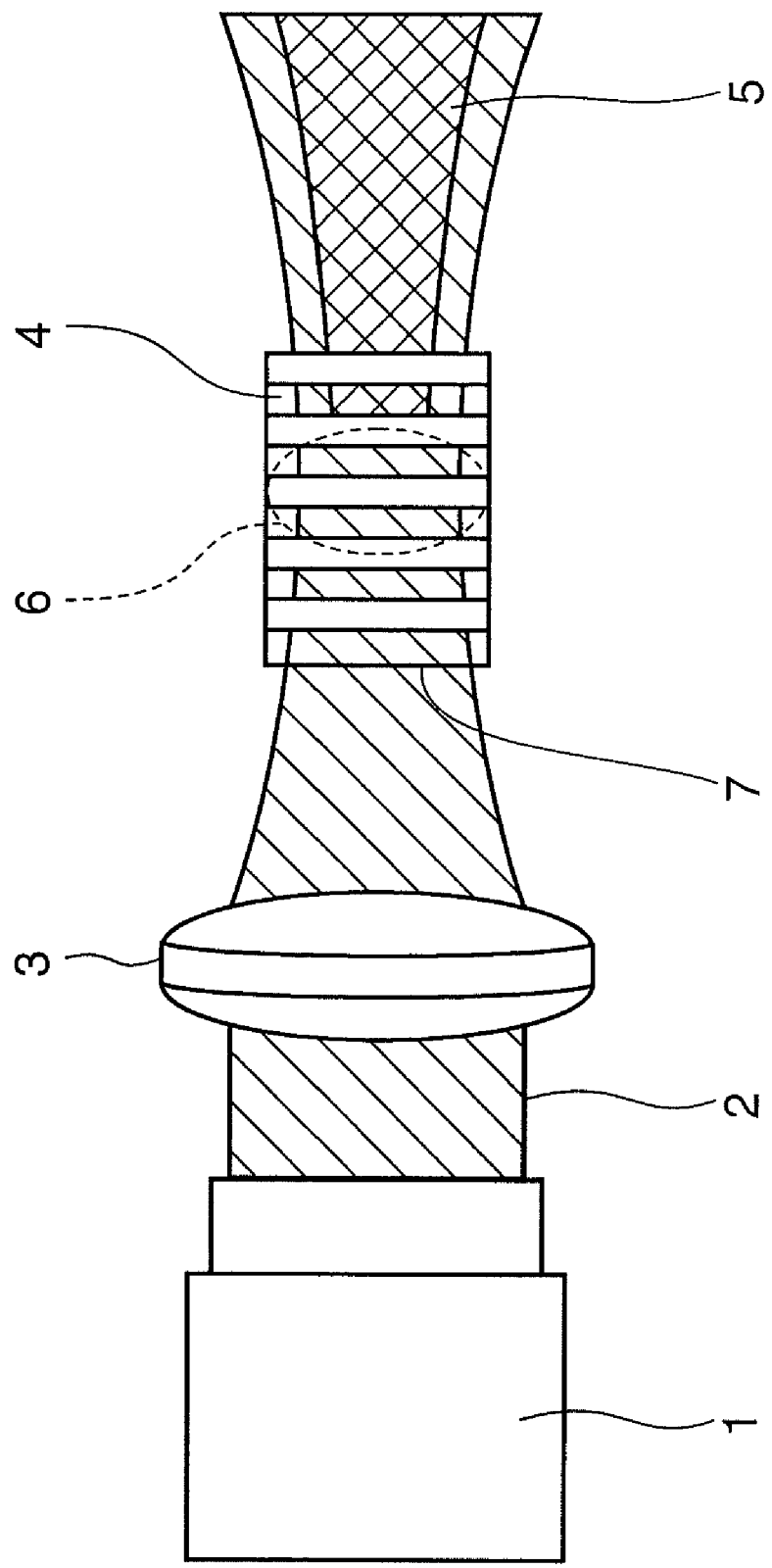
FIG. 1 is a diagram showing a general laser wavelength converter.

FIG. 1 is a diagram of a laser wavelength converter according to one embodiment of the present invention. First of all, with reference to FIG. 1, an optimal condensing condition in the laser wavelength converter is described with reference to FIG. 1.

The laser wavelength converter is provided with a laser light source 1 for emitting laser light (e.g. infrared light) as a fundamental wave, a condenser lens 3 for condensing laser light 2 from the laser light source 1, and a wavelength conversion element 4 for converting the laser light 2 condensed by the condenser lens 3 into a second harmonic (e.g. green light) 5.

When the laser light 2 in the form of a plane wave is incident on the wavelength conversion element 4, an efficiency for wavelength converting the laser light 2 into the second harmonic 5 is given by equation (1).

$$\eta = 8\pi^2 \left(\frac{\mu_0}{\varepsilon_0}\right)^{\frac{1}{2}} \frac{d^2}{n^3} \left(\frac{L}{\lambda}\right)^2 \frac{P_\omega}{A} \frac{\sin^2\left(\frac{\Delta k L}{2}\right)}{\left(\frac{\Delta k L}{2}\right)^2} \quad (1)$$

Here, $\mu_0$ is a magnetic permeability of vacuum, $\varepsilon_0$ is a dielectric constant of vacuum, d is an effective nonlinear constant, n is a refractive index of the element, L is an element length, $\lambda$ is a wavelength of the fundamental wave, $P_\omega$ is an incident power of the fundamental wave, A is a beam cross-sectional area, and $\Delta k$ is a difference ($k_{2\omega} - 2k_\omega$) between the wave number of the fundamental wave and that of the second harmonic.

As can be understood from Equation (1), when a phase matching condition Δk=0 is reached, a high wavelength conversion efficiency can be obtained by maximally narrowing a beam of the laser light 2 in the wavelength conversion element over a maximum long distance.

Thus, optical waveguide type wavelength conversion elements capable of long distance propagation with a small beam diameter are widely used as the wavelength conversion element 4. However, since light intensity in a crystal becomes excessively high in the optical waveguide type wavelength conversion element, it is not suitable for wavelength conversion for obtaining a high-output second harmonic. Accordingly, bulk type wavelength conversion elements are frequently used as a wavelength conversion element to obtain a high-output second harmonic.

Since the beam diameter of the laser light 2 condensed by the condenser lens 3 increases with distance from a condensed position, an optimal condensed position 6 of infrared light is located in a central part of the wavelength conversion element 4 (or a polarization-reversed structure formed therein). If NA is excessively increased to reduce a beam cross-sectional area (beam waist diameter), a divergence angle increases by light diffraction and the beam cannot be narrowed over a long distance, wherefore the conversion efficiency is reduced on the contrary. Thus, an optimal condensed state exists for each length of the element and an optimal condensing condition is reached when a confocal parameter b given by Equation (2) satisfies L/b=2.84 when $r_0$ is the beam waist diameter (see Applied Physics letters, 39, 8, 3957-3936 (1968)).

$$b = \frac{2\pi \cdot n \cdot r_0^2}{\lambda} \quad (2)$$

It is desirable to maximally narrowly condense the beam over the maximum long distance as described above. The laser light 2 for satisfying the optimal condensing condition is an ideal Gaussian beam with M2=1. For example, if the laser light 2 is an elliptical beam, the conversion efficiency decreases as the ellipticity thereof increases (as a ratio of a major axis to a minor axis increases). Further, if the condensed point of the laser light 2 has an astigmatic difference, the conversion efficiency decreases as the astigmatic difference increases.

An example of dependency of the conversion efficiency on M2 or the condensed position in the wavelength conversion element 4 is described below.

Figure 2:
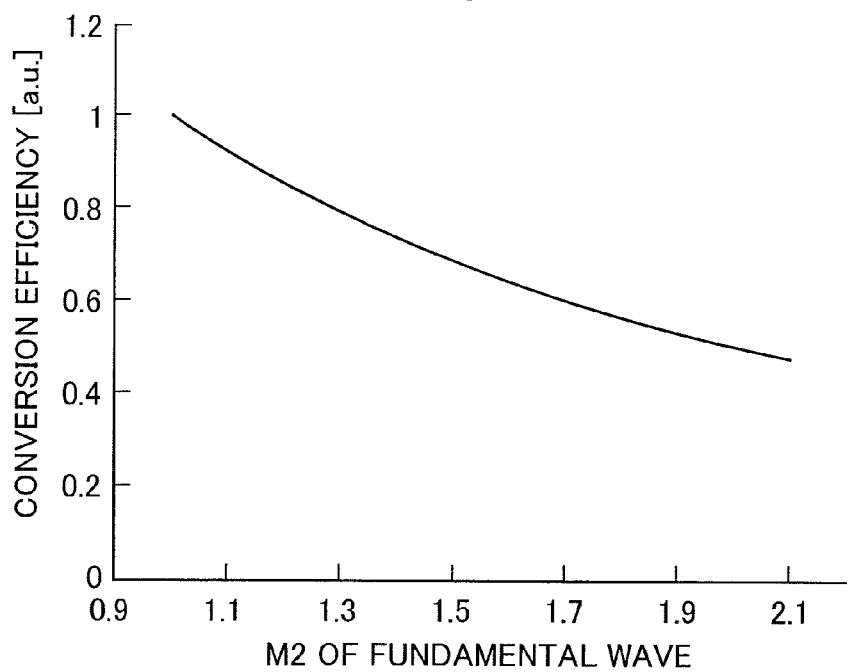
FIG. 2 is a graph showing a relationship between a wavelength conversion efficiency and M2.

In the wavelength conversion element shown in FIG. 1, the conversion efficiency for M2 is as shown in FIG. 2 and optimal when M2=1 if the length of the wavelength conversion element 4 is 26 mm and the beam waist diameter is 60 μm (condensed position is in the center of the element).

Figure 3:
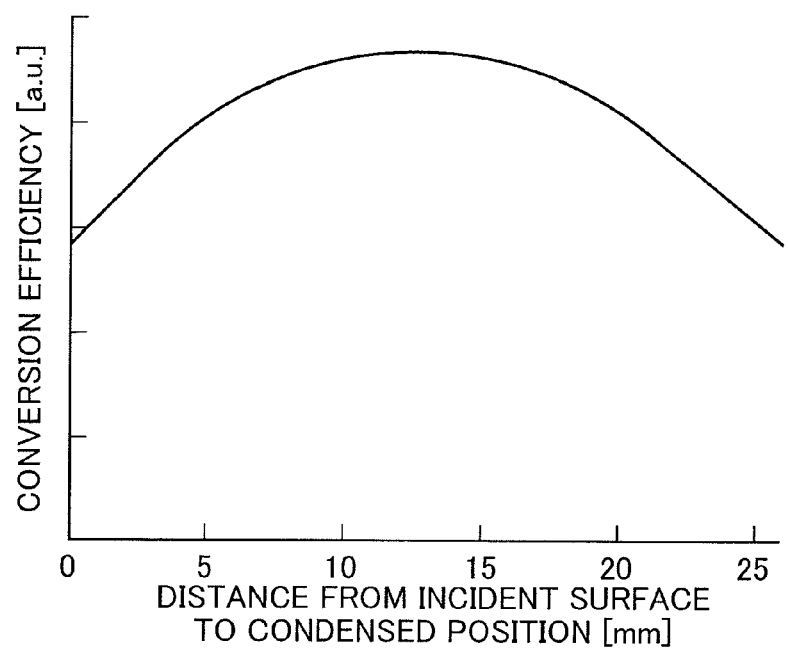
FIG. 3 is a graph showing a relationship between a condensed position and a wavelength conversion efficiency.

If the condensed position exists in the wavelength conversion element 4, a relationship between a distance from an incident surface 7 of the wavelength conversion element 4 to the condensed position of the laser light 2 and the wavelength conversion efficiency is as shown in FIG. 3. In other words, if the condensed position 6 is located at a central position (13 mm from the incident surface) of the wavelength conversion element 4 in a length direction (optical axis direction of the laser light 2), light intensity in the wavelength conversion element 4 is highest and the wavelength conversion efficiency is highest.

A crystal destruction mechanism of the wavelength conversion element 4 is described below.

The wavelength conversion element 4 used is, for example, composed of lithium niobate or lithium tantalate. Such a wavelength conversion element 4 is known to be destructed if an attempt is made to obtain a harmonic (e.g. green light) of a high output. The destruction of the wavelength conversion element 4 has been thought to be caused by heat generated by the absorption of the fundamental wave (laser light 2) by the harmonic. Thus, in order to suppress the destruction of the wavelength conversion element 4, it has been thought to be effective that the cross-sectional area of the beam of the fundamental wave is increased to reduce the power density of the fundamental wave.

However, if the cross-sectional area of the beam of the fundamental wave is increased, there has been a problem that the conversion efficiency of the wavelength conversion element is drastically reduced and conversion with a high efficiency is difficult. The inventors of the present application found out that the generation of heat at the time of obtaining a high-output harmonic was not caused by the absorption of a fundamental wave, but a phenomenon of absorbing the harmonic by sum-frequency light (e.g. ultraviolet light) of the fundamental wave and the harmonic. Further, it was confirmed by an experiment that the absorptance of visible light increases as the light intensity of the sum-frequency light increases.

Based on the above facts, the cause of the crystal destruction that occurs upon obtaining a high-output harmonic in the wavelength converter shown in FIG. 1 is thought to be as follows. An exemplary case where infrared light of 6 W is incident on the above wavelength conversion element (having an element length of 26 mm) 4 using the lithium niobate to be wavelength converted into green light utilizing the construction of the wavelength converter shown in FIG. 1 is described below.

Figure 4:
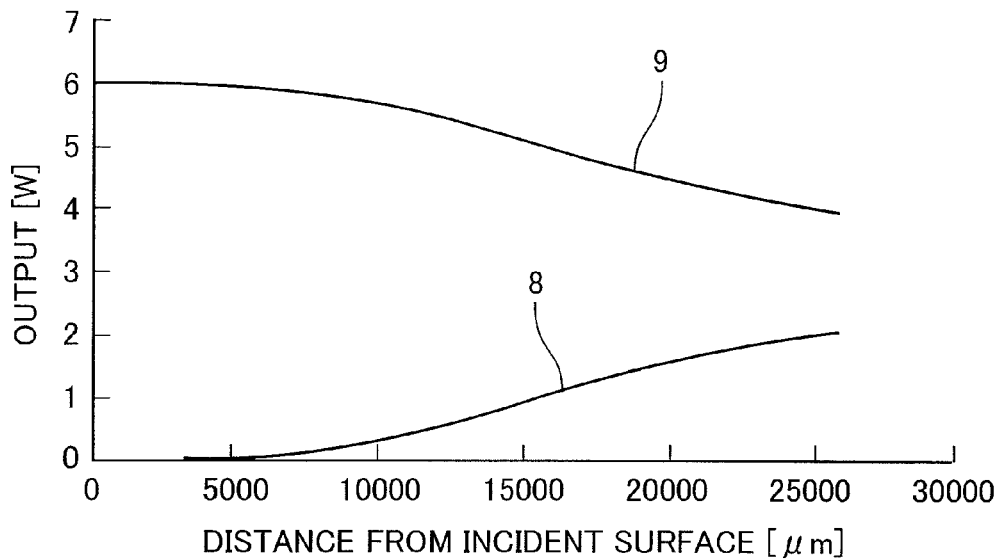
FIG. 4 is a graph showing output changes of infrared light and green light in a wavelength conversion element shown in FIG. 1.
Figure 5:
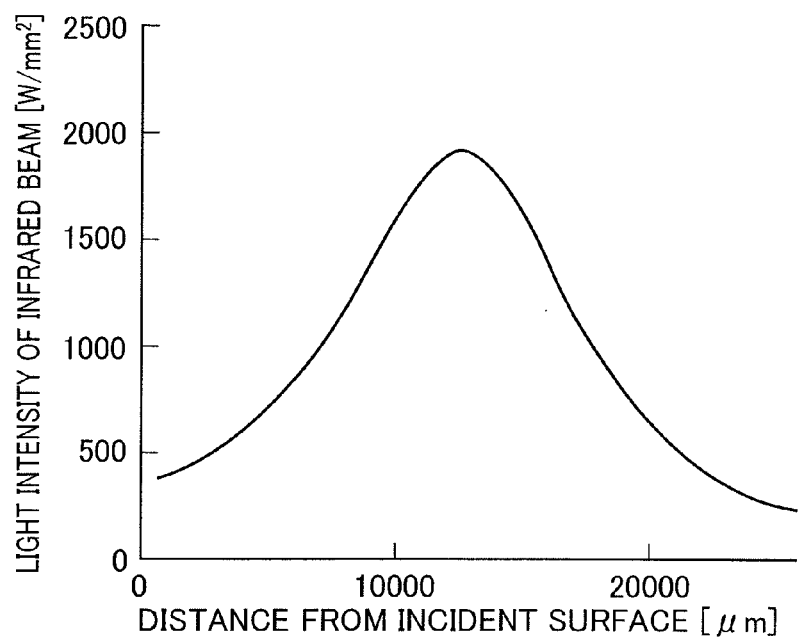
FIG. 5 is a graph showing a relationship between light intensity of infrared light and a distance from an incident surface in the wavelength conversion element shown in FIG. 1.
Figure 6:
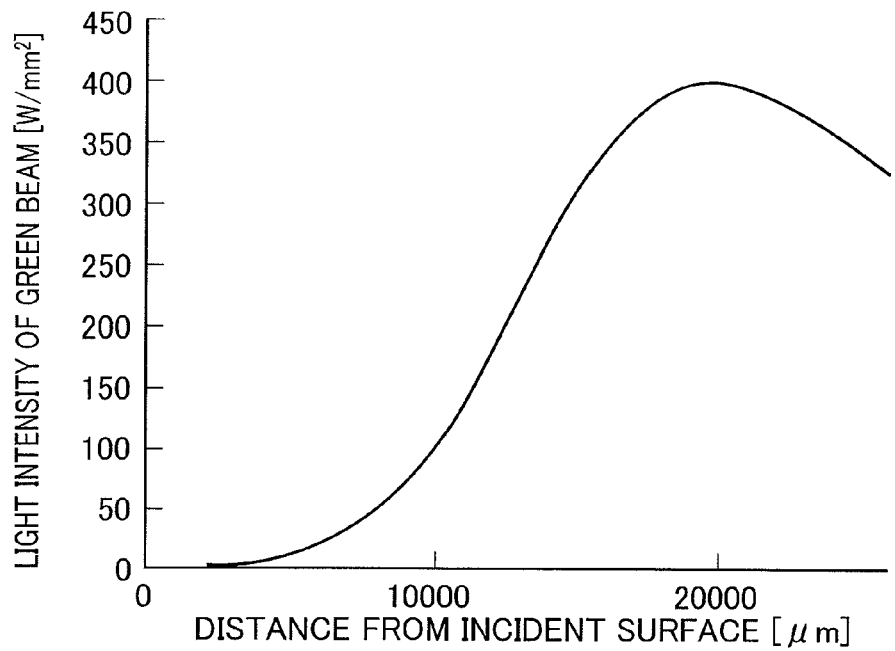
FIG. 6 is a graph showing a relationship between light intensity of green light and a distance from the incident surface in the wavelength conversion element shown in FIG. 1.
Figure 7:
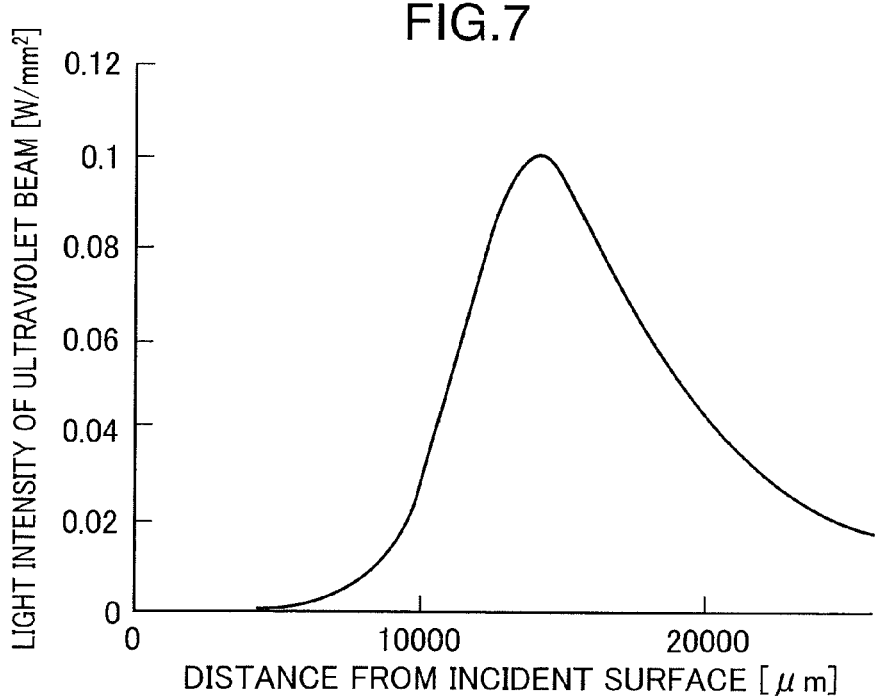
FIG. 7 is a graph showing a relationship between light intensity of ultraviolet light and a distance from the incident surface in the wavelength conversion element shown in FIG. 1.

Since the infrared light is gradually converted into the green light in the wavelength conversion element 4, the output of the green light in the wavelength conversion element 4 increases as shown by 8 in FIG. 4 and, on the other hand, the output of the infrared light decreases as shown by 9 in FIG. 4. Since the condensed position of the infrared light is set near the central position of the wavelength conversion element 4 in the wavelength converter shown in FIG. 1, the light intensity of the infrared light maximizes at a position before the central position of the wavelength conversion element 4 as shown in FIG. 5 and the light intensity of the green light maximizes at a position after the central position of the wavelength conversion element 4 as shown in FIG. 6. Further, at this time, the light intensity of ultraviolet light generated in proportion to the product of the light intensity of the infrared light and that of the green light is as shown in FIG. 7.

Figure 8:
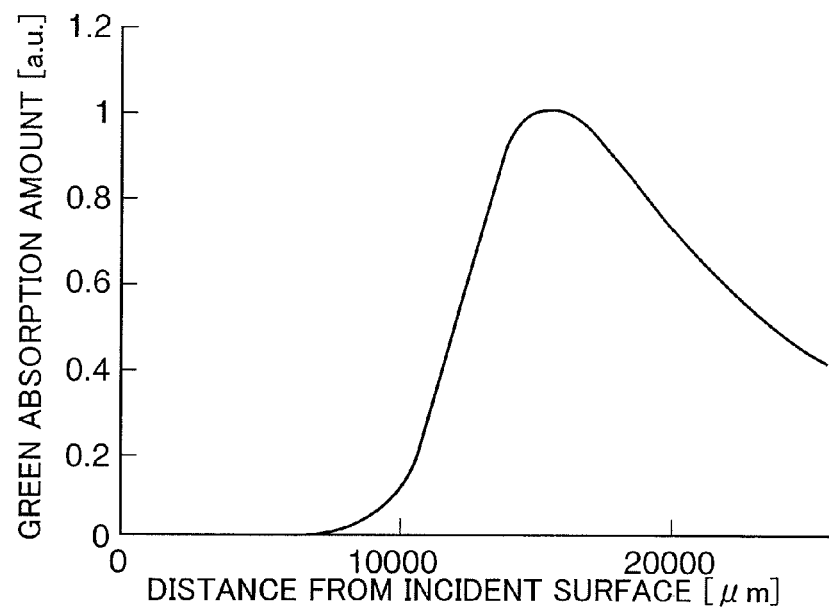
FIG. 8 is a graph showing a relationship between absorption amount of green light and a distance from the incident surface in the wavelength conversion element shown in FIG. 1.

The absorption amount of the green light by the ultraviolet light in the wavelength conversion element 4 distributes as shown in FIG. 8 based on the light intensity of the ultraviolet light and the output of the green light. The crystal destruction of the wavelength conversion element 4 is thought to occur in a part slightly behind the central position of the wavelength conversion element 4 where the absorption amount of the green light maximizes in FIG. 8. The part where the absorption amount of the green light maximizes in FIG. 8 substantially coincides with the position of the crystal destruction that occurred in the experiment.

From the above, the inventors of the present application found out that two points: a reduction in the generation of ultraviolet light and a deviation of a position where the light intensity of the ultraviolet light is high and a position where the light intensity of the green light is high are important to realize a high-output wavelength conversion without causing the crystal destruction of the wavelength conversion element 4. By satisfying at least one of these two points, local heat generation of the wavelength conversion element 4 can be suppressed by reducing the overlap of the ultraviolet light and the green light.

In the experiment, it was found that the wavelength conversion element 4 is locally heated at a position where the absorption amount of the green light by the ultraviolet light maximizes upon outputting a harmonic exceeding 1 W using the wavelength converter of FIG. 1, whereby a refractive index of the wavelength conversion element 4 locally changes to cause a beam degradation and a reduction of wavelength conversion efficiency. The calorific value of the wavelength conversion element 4 decreases according to the reduction of the wavelength conversion efficiency, but the wavelength conversion efficiency recovers again according to this reduction of the calorific value. Thus, it has been revealed that the increase and decrease of the wavelength conversion efficiency repeat and the beam degradation also repeats. Therefore, it becomes possible to also suppress cyclical changes of the beam gradation and wavelength conversion efficiency if a local temperature increase of the wavelength conversion element 4 can be reduced.

Accordingly, the following constructions are proposed as a construction for realizing a high conversion efficiency by satisfying the above respective conditions.

First Embodiment

Figure 9:
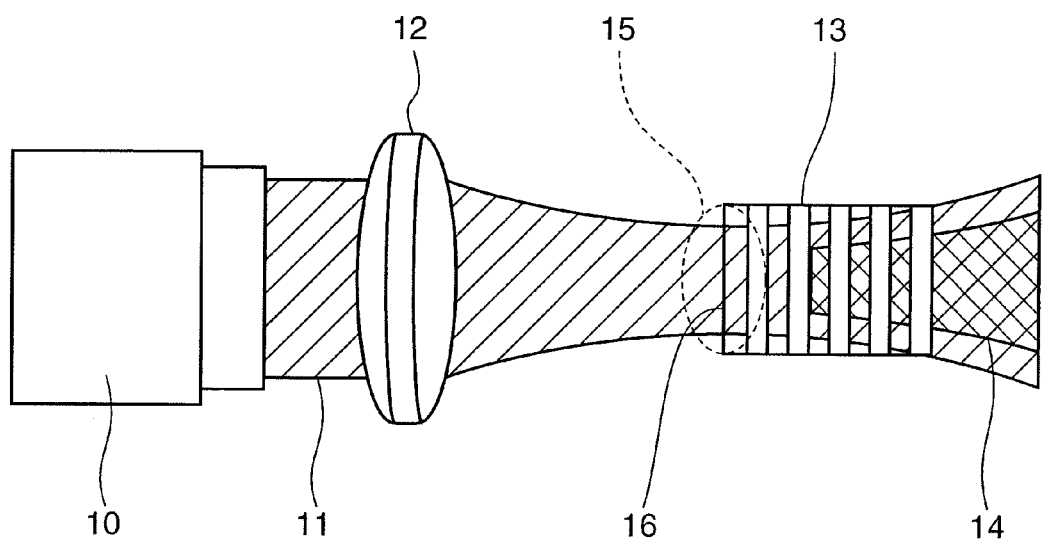
FIG. 9 is a diagram showing a wavelength converter according to a first embodiment of the invention.

FIG. 9 is a schematic diagram showing a laser wavelength converter according to this embodiment.

The wavelength converter shown in FIG. 9 is provided with a laser light source 10, a condenser lens 12 for condensing infrared light (coherent light) 11 from this laser light source 10, and a wavelength conversion element 13 for converting the infrared light 11 condensed by the condenser lens 12 into green light 14.

The wavelength converter is constructed such that the infrared light 11 emitted from the laser light source 10 is condensed using the condenser lens 12 and incident on the wavelength conversion element 13. The wavelength conversion element 13 wavelength converts a part of the incident fundamental wave (infrared light) to generate the green light 14.

Here, a condensed position 15 of the infrared light is set near an incident surface 16 of the wavelength conversion element 13 in this wavelength converter unlike the one shown in FIG. 1. Specifically, a distance from the wavelength conversion element 13 to the laser light source 10 is set to be longer than the one shown in FIG. 1.

The laser light source 10 includes a solid-state laser for emitting the infrared light 11 having a beam diameter of 500 μm and a wavelength of 1064 nm as parallel light. The infrared light 11 emitted from the laser light source 10 is a linearly polarized Gaussian beam.

The condenser lens 12 is a spherical lens of f30.

In the wavelength conversion element 13, a direction of polarization of lithium niobate is reversed in a period of 6.97 μm for quasi phase matching. Further, a dimension of the wavelength conversion element 13 in a length direction parallel to an optical axis of the laser light 12 is 26 mm. The wavelength conversion element 13 is designed such that the conversion efficiency of the green light 14 maximizes in a temperature range between 20° (inclusive) and 50° (inclusive) if the infrared light 11 is incident in a state where a polarization direction of the infrared light 11 coincides with the direction of polarization of the wavelength conversion element 13.

Figure 10:
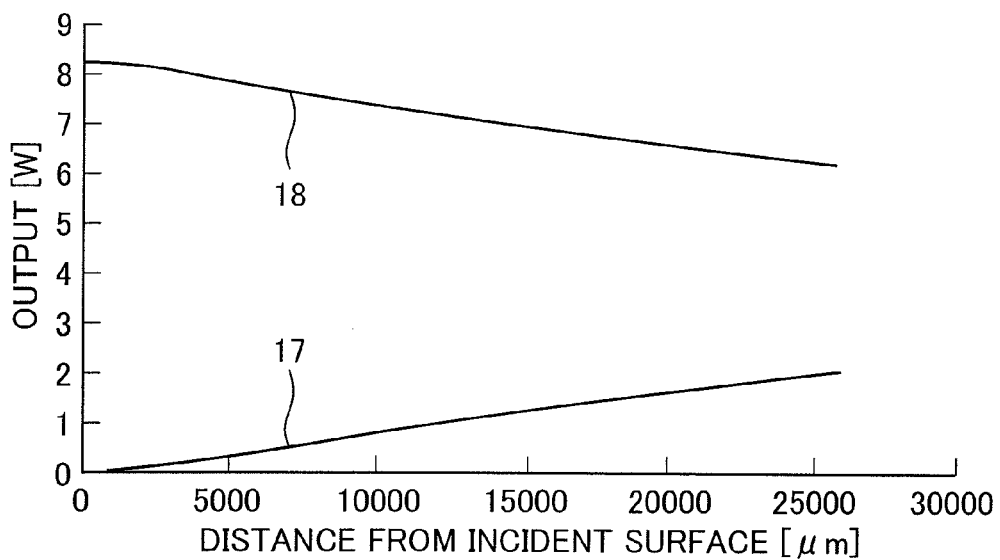
FIG. 10 is a graph showing output changes of infrared light and green light in a wavelength conversion element shown in FIG. 9.

In the case of wavelength converting the infrared light 11 of 8.2 W into the green light 14 using the above wavelength converter, the infrared light is gradually converted into the green light in the wavelength conversion element 13 as in the wavelength converter show in FIG. 1. Accordingly, the output of the green light 14 in the wavelength conversion element 13 increases as indicated by 17 in FIG. 10 and becomes 2 W near an emergent surface of the wavelength conversion element 13. Further, the output of the infrared light 11 gradually decreases as indicated by 18 in FIG. 10.

Figure 11:
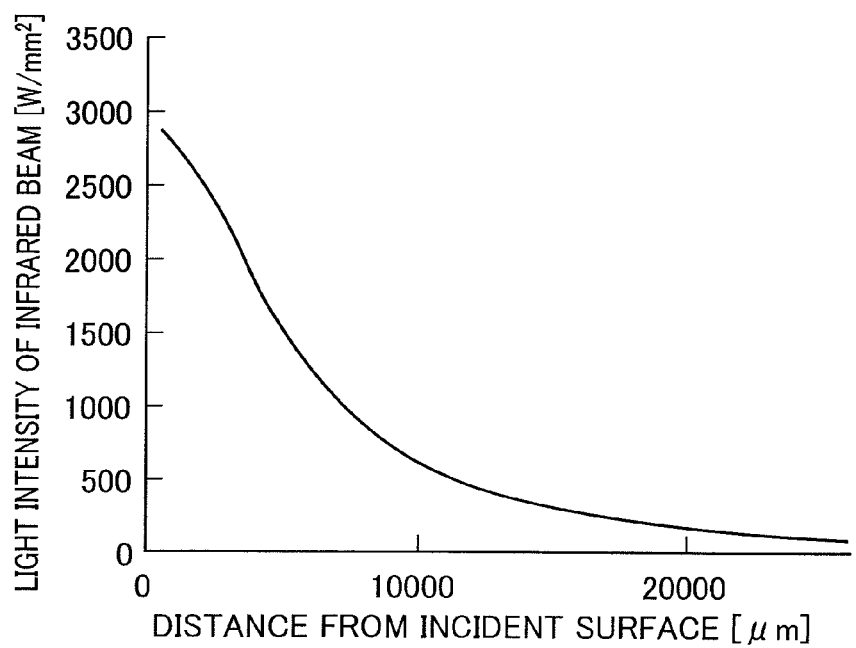
FIG. 11 is a graph showing a relationship between light intensity of infrared light and a distance from an incident surface in the wavelength conversion element shown in FIG. 9.
Figure 13:
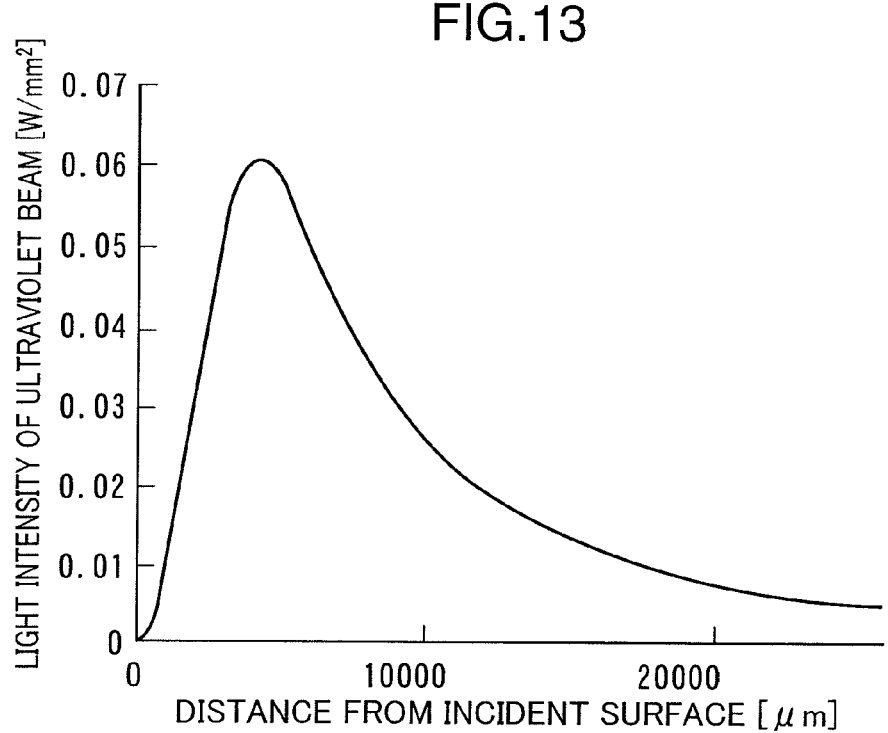
FIG. 13 is a graph showing a relationship between light intensity of ultraviolet light and a distance from the incident surface in the wavelength conversion element shown in FIG. 9.

Here, since the condensed position of the infrared light 11 is set near the incident surface 16 of the wavelength conversion element 13 in the wavelength converter of this embodiment, the light intensity of the infrared light maximizes near the incident surface 16 of the wavelength conversion element 13 as shown in FIG. 11. Accordingly, the light intensity of the green light 14 also maximizes at a position closer to the incident surface 16 of the wavelength conversion element 13 than in the wavelength converter (see FIG. 6) shown in FIG. 1. Thus, the light intensity of the ultraviolet light generated in proportion to the product of the light intensity of the infrared light 11 and that of the green light 14 distributes as shown in FIG. 13. In other words, the light intensity of the ultraviolet light in the second half (range after the condensed position of the infrared light 11) of the wavelength conversion element 13 where the output of the green light 14 increases and the crystal destruction is more likely to occur can be drastically reduced to or below 20% of the light intensity of the ultraviolet light in the wavelength converter shown in FIG. 1.

Figure 14:
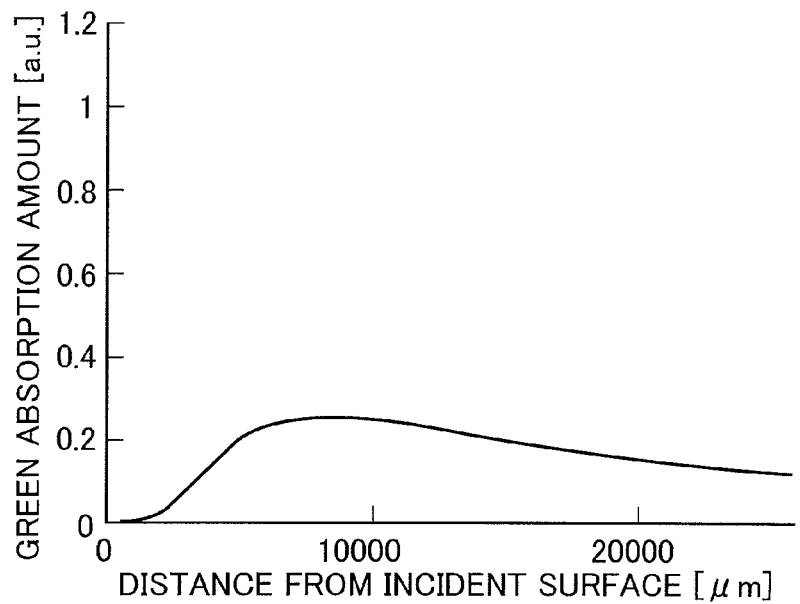
FIG. 14 is a graph showing a relationship between absorption amount of green light and a distance from the incident surface in the wavelength conversion element shown in FIG. 9.

As a result, the absorption amount of the green light 14 by the ultraviolet light generated in the wavelength conversion element 13 distributes as shown in FIG. 14. In other words, the peak absorption amount can be reduced to about 20% of that of the wavelength conversion element shown in FIG. 1. Thus, according to the wavelength converter of this embodiment, a high-output wavelength conversion can be performed while the crystal destruction of the wavelength conversion element 13 is suppressed. Further, since the heat generation of the wavelength conversion element 13 can also be suppressed, it is also possible to reduce a change of the refractive index of the wavelength conversion element 13 and reduce the beam gradations and conversion efficiency variations of the infrared light 11 and the green light 14.

Since the beam diameter of the green light 14 in the second half of the wavelength conversion element 13 can be set to about 1.6 times as large as that of the green light 5 of the wavelength converter of FIG. 1 in this wavelength converter, the light intensity of the green light 14 can be reduced. In this way, a peak value of heat gradient caused by the absorption of the green light 14 by the ultraviolet light can be further reduced by 32% and a wavelength convertible green output can be further increased without causing any crystal destruction.

Figure 15:
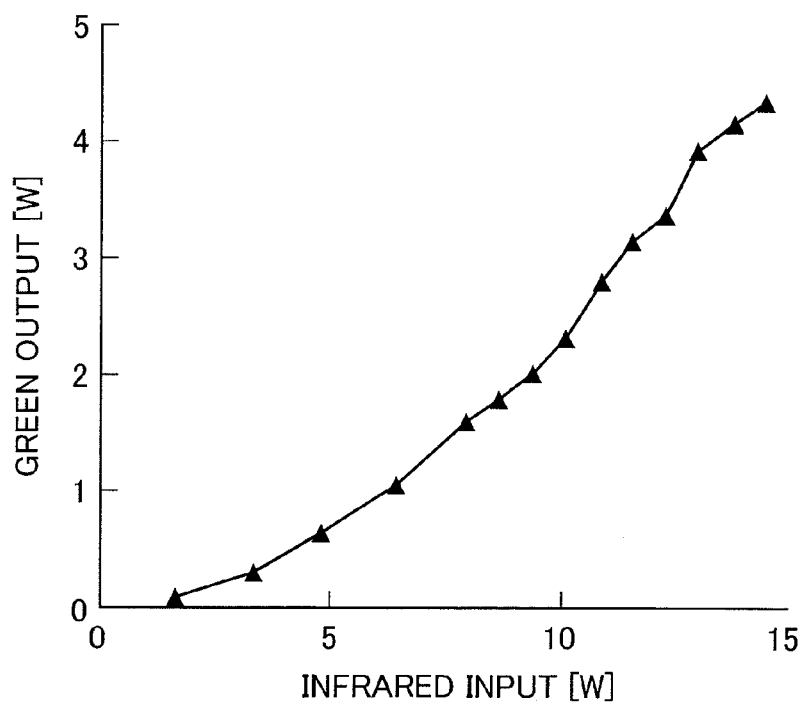
FIG. 15 is a graph showing a relationship between an input of infrared light and an output of green light for the wavelength conversion element shown in FIG. 9.

FIG. 15 is a graph showing a relationship between the input of the infrared light and the output of the green light in the wavelength converter according to the first embodiment. As shown in FIG. 15, it was confirmed by an experiment of the present inventors that a green light output of 4.3 W could be obtained without causing the crystal destruction of the wavelength conversion element 13 if infrared light of 14.4 W was incident.

Figure 16:
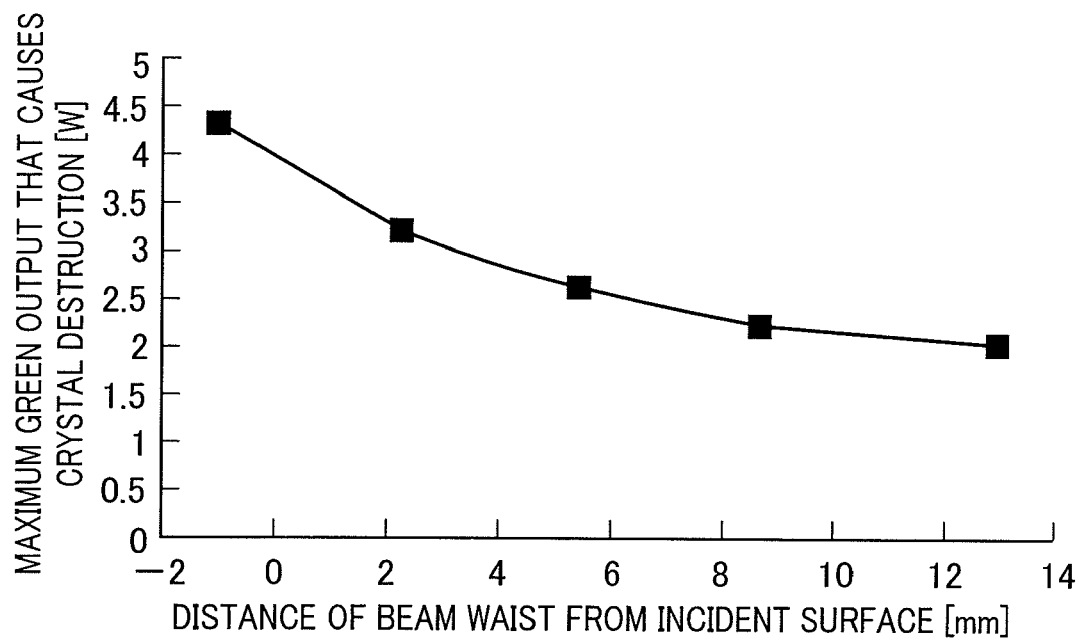
FIG. 16 is a graph showing a relationship between a condensed position and an output of green light as a threshold value where crystal destruction is caused.

FIG. 16 is a graph showing a relationship between a distance from the incident surface of the wavelength conversion element to the condensed position of the infrared light and a maximum output of the green light that causes crystal destruction in the wavelength converter according to the first embodiment. As shown in FIG. 16, it can be understood that as the condensed position of the infrared light 11 becomes more distant from the central position of the wavelength conversion element 13 and becomes closer to the incident surface 16 of the wavelength conversion element 13, the value of the output of the green light 14 that causes the crystal destruction increases (if the infrared light 11 is condensed at the incident surface 16, the crystal destruction of the wavelength conversion element 13 does not occur even if the output of the green light 14 is 4.3 W). Further, by moving the condensed position of the infrared light 11 to an outer side of the wavelength conversion element 13, i.e. to a side before the incident surface 16 of the wavelength conversion element 13, a maximum possible output of the green light 14 can be further increased without causing the crystal destruction.

However, since the wavelength conversion efficiency is higher as the condensed position of the infrared light 11 gets closer to the central position of the wavelength conversion element 13 as shown in FIG. 3, it is desirable to adjust the condensed position of the infrared light 11 to an optimal one in accordance with the output of the green light 14 that is required.

For example, if the infrared light 11 is condensed at the incident surface 16 of the wavelength conversion element 13, the green light 14 of about 2.3 W can be outputted from the infrared light 11 of about 10 W (see FIG. 16). On the contrary, if the condensed position of the infrared light 11 is set at an inner side of the wavelength conversion element 13 located at about 2 mm from the incident surface 16 of the wavelength conversion element 13, the green light 14 of about 3 W can be obtained from the infrared light 11 of about 10 W (wavelength conversion efficiency of 30%). Thus, the wavelength conversion efficiency can be increased by about 30% as compared with the case where the condensed position of the infrared light 11 is set at the incident surface 16. However, if the condensed position of the infrared light 11 is brought further closer to the central position of the wavelength conversion element 13, the crystal destruction occurs. Therefore, the condensed position of the infrared light 11 where the wavelength conversion can be most efficiently performed when the infrared light 11 of 10 W is inputted is the inner position at about 2 mm from the incident surface 16 of the wavelength conversion element 13.

For example, if the condensed position of the infrared light 11 is set at an inner position at 5 mm from the incident surface 16 of the wavelength conversion element 13, the green light 14 of at most about 2.5 W can be outputted and the wavelength conversion efficiency at this time is 36%. On the contrary, in the wavelength converter shown in FIG. 1, a temperature distribution is produced in the wavelength conversion element 4 as the output of the green light 5 increases, wherefore the wavelength conversion efficiency is reduced. Thus, in order to output the green light 5 of 2 W using the wavelength converter shown in FIG. 1, the infrared light 2 of about 7 W needed to be inputted in the experiment and the wavelength conversion efficiency at that time was about 29%. From this comparison, it can be understood that the wavelength conversion efficiency is improved by adjusting the condensed position of the infrared light 11 as in the wavelength converter according to this embodiment. Further, if the condensed position of the infrared light 11 is set at an inner position at about 10 mm from the incident surface 16 of the wavelength conversion element 13, green light of about 2.2 W could be obtained when the infrared light 11 of about 7 W was incident. The wavelength conversion efficiency at this time was 31%.

Since the heat generation of the wavelength conversion element 13 during the wavelength conversion can be reduced and a change of the refractive index of the wavelength conversion element 13 caused by the heat generation can be suppressed in the wavelength converter according to this embodiment, a reduction of the conversion efficiency caused by the reduction of the refractive index can be prevented. In other words, the wavelength conversion efficiency of the wavelength converter according to this embodiment is reduced more than that of FIG. 3 as the condensed position of the infrared light 11 comes closer to the central position of the wavelength conversion element 13 and more approximates to that of FIG. 3 as the condensed position of the infrared light 11 comes closer to the incident surface 16 of the wavelength conversion element 13. Accordingly, the conversion efficiency is reversed in the case where the condensed position of the infrared light 11 is set near the central position of the wavelength conversion element 13 and in the case where it is set at the side of the incident surface 16 of the wavelength conversion element 13. In other words, in the case of obtaining high-output green light 14, the conversion efficiency higher than in the wavelength converter shown in FIG. 1 can be obtained by employing the wavelength converter according to this embodiment. Particularly, if the condensed position of the infrared light 11 is set at an inner position of the wavelength conversion element 13 where the distance between the incident surface 16 of the wavelength conversion element 13 and the condensed position of the infrared light 11 is equal to or shorter than 40% of the length of the wavelength conversion element 13, the maximum output of the green light 14 can be increased by 10% or more and the conversion efficiency at that time can also be increased as compared with the case where the infrared light 11 is condensed at the central position of the wavelength conversion element 13. Further, if the condensed position of the infrared light 11 is set at an inner position of the wavelength conversion element 13 where the distance between the incident surface 16 of the wavelength conversion element 13 and the condensed position of the infrared light 11 is equal to or shorter than 25% of the length of the wavelength conversion element 13, the maximum output of the green light 14 can be increased by about 30% or more.

Although the length of the wavelength conversion element 13 is 26 mm in this embodiment, it goes without saying that similar effects can be obtained by moving the condensed position of the infrared light 11 toward the incident surface 16 of the wavelength conversion element 13 regardless of the length. Specifically, the output can be increased by about 10% or more by setting the distance between the condensed position of the infrared light 11 and the incident surface 16 of the wavelength conversion element 13 to 40% or less of the length of the wavelength conversion element 13 similar to this embodiment if the length of the wavelength conversion element 13 is 5 mm or longer and 70 mm or shorter. Further, by setting the distance between the condensed position of the infrared light 11 and the incident surface 16 of the wavelength conversion element 13 to 25% or less of the length of the wavelength conversion element 13, the output can be increased by 30% or more. Even if the length of the wavelength conversion element 13 is below 5 mm or above 70 mm, similar effects can be obtained by optimizing the condensed beam diameter simultaneously with the adjustment of the condensed position. In light of ensuring the optical path of the infrared light 11 for wavelength conversion, the length of the wavelength conversion element 13 is preferably set to 10 mm or longer.

Figure 17:
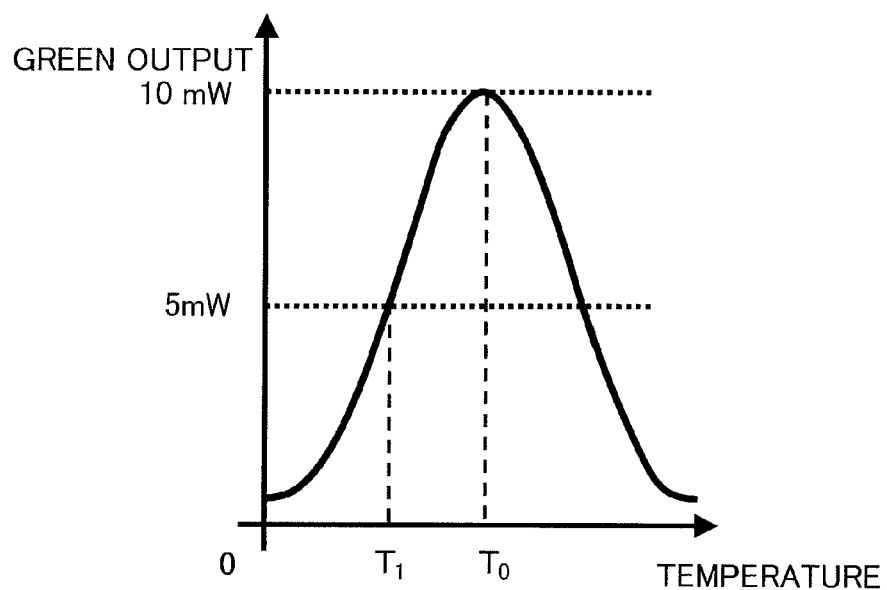
FIG. 17 is a graph showing an exemplary relationship between temperature of the wavelength conversion element and an output of green light at the time of low-output crystal destruction conversion.
Figure 18:
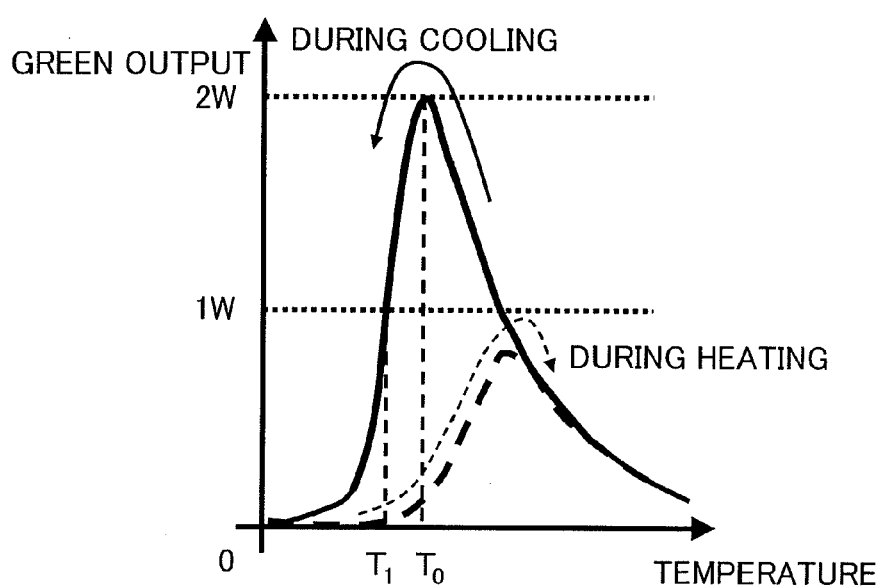
FIG. 18 is a graph showing an exemplary relationship between temperature of the wavelength conversion element and an output of green light at the time of high-output crystal destruction conversion.

It was also found out that a problem of making the output of the green light 14 unstable upon obtaining high-output green light 14 could be improved by the wavelength converter according to this embodiment. FIG. 17 is a graph showing a relationship between the temperature of the wavelength conversion element 13 and the output of the green light 14 upon obtaining low-output green light 14. FIG. 18 is a graph showing a relationship between the temperature of the wavelength conversion element 13 and the output of the green light 14 upon obtaining high-output green light 14.

As shown in FIG. 17, in the case of performing a wavelength conversion to obtain low-output green light 14 of about several mW (an example with about 10 mW is shown in FIG. 17), the output of the green light 14 displays a temperature characteristic symmetric at high-temperature and low-temperature sides with an optimal temperature $T_0$ as a center. However, as shown in FIG. 18, the calorific value of the wavelength conversion element 13 increases on the optical path of the infrared light 11 and a large temperature difference is produced between the optical path of the infrared light 11 and its surrounding in the case of performing a wavelength conversion to obtain high-output green light 14 exceeding 1 W. Thus, the output of the green light 14 displays a characteristic asymmetric at the high-temperature and low-temperature sides with respect to the optimal temperature $T_0$. In FIGS. 17 and 18, a difference between temperature $T_1$ at the low-temperature side where the output of the green light 14 is halved and the optimal temperature $T_0$ is a half width at the low-temperature side. It can be understood that the half width is narrower at the time of the high output shown in FIG. 18 than at the time of the low output shown in FIG. 17. In this way, the half width differs at the low-temperature side and at the high-temperature side at the time of the high output, which caused the output of the green light 14 to be unstable.

Figure 19:
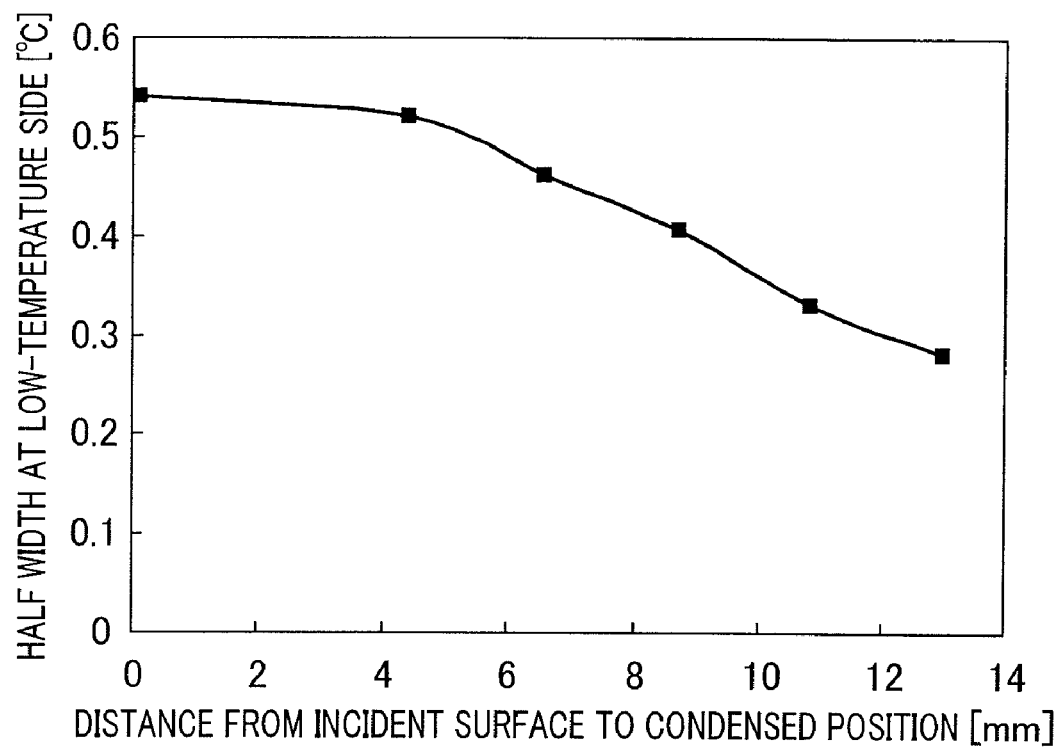
FIG. 19 is a graph showing a relationship between a condensed position and a half temperature range at a low temperature side.

As shown in FIG. 19, in the case of bringing the condensed position of the infrared light 11 closer to the incident surface 16 of the wavelength conversion element 13, the half width at the low-temperature side increases as the condensed position of the infrared light 11 comes closer to the incident surface 16. For example, when the distance between the condensed position of the infrared light 11 and the incident surface 16 of the wavelength conversion element 13 is 40% or less of the length of the wavelength conversion element 13, the half width at the low-temperature side can be widened by 20% or more as compared with the case where the infrared light 11 is condensed at the central position of the wavelength conversion element 13. Particularly, when the distance between the condensed position of the infrared light 11 and the incident surface 16 of the wavelength conversion element 13 is 25% or less of the length of the wavelength conversion element 13, the half width at the low-temperature side exceeds 0.5° C. Therefore, the temperature of the wavelength conversion element 13 can be more easily controlled and a control using a more inexpensive control component becomes possible.

Although the length of the wavelength conversion element 13 is 26 mm in this embodiment, it goes without saying that similar effects can be obtained by moving the condensed position of the infrared light 11 toward the incident surface 16 of the wavelength conversion element 13 regardless of the length. Specifically, the half width at the low-temperature side can be widened by 20% or more by setting the distance between the condensed position of the infrared light 11 and the incident surface 16 of the wavelength conversion element 13 to 40% or less of the length of the wavelength conversion element 13 similar to this embodiment if the length of the wavelength conversion element 13 is 5 mm or longer and 70 mm or shorter. Further, by setting the distance between the condensed position of the infrared light 11 and the incident surface 16 of the wavelength conversion element 13 to 25% or less of the length of the wavelength conversion element 13, the half width at the low-temperature side exceeds 0.5° C. Even if the length of the wavelength conversion element 13 is below 5 mm or above 70 mm, similar effects can be obtained by optimizing the condensed beam diameter simultaneously with the adjustment of the condensed position. In light of ensuring the optical path of the infrared light 11 for wavelength conversion, the length of the wavelength conversion element 13 is preferably set to 10 mm or longer.

With reference to FIG. 18 again, curves representing temperature characteristics do not coincide in a process of heating the wavelength conversion element and a process of cooling it in the case of obtaining a high-output harmonic. In other words, since hysteresis in accordance with the cooling process or heating process of the wavelength conversion element are present in the temperature characteristics shown in FIG. 18, there has been a problem of being difficult to constantly control the output of the green light 14 by the wavelength conversion element 13. On the contrary, it was empirically confirmed that the above hysteresis were reduced to a controllable extent by setting the condensed position of the infrared light 11 such that the distance between the condensed position of the infrared light 11 and the incident surface 16 of the wavelength conversion element 13 is 15% or less of the length of the wavelength conversion element 13.

Figure 20:
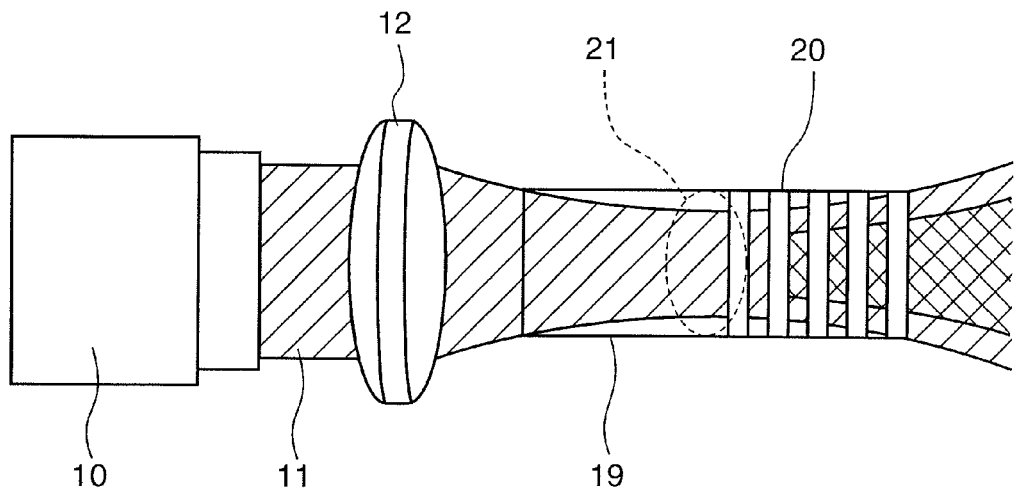
FIG. 20 is a diagram showing a modification of a wavelength converter according to the first embodiment.

As described above, the wavelength conversion efficiency upon obtaining high-output green light 14 is higher as the condensed position of the infrared light 11 is brought closer to the incident surface 16 of the wavelength conversion element 13. However, since the vicinity of an incident surface of a crystal is generally susceptible to laser damage, crystal destruction is thought to occur at the incident surface even if the influence of the absorption of green light by ultraviolet light is small. In order to avoid such laser damage, a wavelength conversion element as shown in FIG. 20 can be, for example, employed. FIG. 20 is a schematic diagram showing a modification of the first embodiment.

With reference to FIG. 20, the wavelength conversion element is provided with a polarization reversal section 20 having a polarization-reversed structure and a non-polarization reversal section 19 extending from the polarization reversal section 20 toward a laser light source 10 and having no polarization-reversed structure. Since a condensed position 21 of infrared light 11 is set near an incident end of the polarization reversal section 20 in the wavelength conversion element shown in FIG. 20, the above effects can be displayed.

The non-polarization reversal section 19 may have a periodically polarization-reversed structure if a phase matching period is so set that wavelength conversion into green light is not performed. In this case, if an average period of the polarization-reversed structure in the non-polarization reversal section 19 is set to differ from that of the polarization-reversed structure in the polarization reversal section 20 by 0.01 μm or more, hardly any wavelength conversion is performed in the non-polarization reversal section 19 as in the case where no polarization reversal period is formed.

In the case of including the polarization reversal section 20 and the non-polarization reversal section 19, it is difficult to measure a distance between the incident end of the polarization reversal section 20 and the condensed position 21. Accordingly, relative positions of the condensed position of the infrared light 11 and the polarization reversal section 20 can be specified by the following method. First of all, a position where the conversion efficiency is highest is specified by moving the wavelength conversion element forward or backward in an optical axis direction of the infrared light 11 after the condensed position of the infrared light 11 is suitably set in the wavelength conversion element. In this way, the condensed position of the infrared light 11 is arranged at a central position of the polarization reversal section 20 where the conversion efficiency is supposed to be highest. Thus, the condensed position of the infrared light 11 can be adjusted as described above by moving the condensed position of the infrared light 11 from this specified position toward the non-polarization reversal section 19 in parallel with the optical axis direction of the infrared light 11.

In the wavelength converter of this embodiment, the output of the green light 14 that causes the crystal destruction of the wavelength conversion element can be further increased by reducing M2 of the infrared light 11. Specifically, if M2 of the infrared light 11 is reduced, the beam diameter in the second half of the wavelength conversion element and an NA for the infrared light 11 increase. If the NA for the infrared light 11 is increased, the intensity of ultraviolet light generated in the second half of the wavelength conversion element can be drastically reduced with the conversion efficiency hardly reduced.

Here, it is thought to change the condenser lens 12 to adjust the NA. Specifically, by changing the condenser lens 12 from the above spherical lens of f30 to a spherical lens of f20, the NA can be set to 0.0125 (about 1.5 times as large as the optimal condensing condition). In an exemplary case where the condensed position of the infrared light 11 is set at an inner position at about 0.92 mm from the incident surface 16 of the wavelength conversion element 13 in this way, the intensity of ultraviolet light generated in the second half of the wavelength conversion element 13 can be reduced by about 45% and, simultaneously, a comparable output of the green light 14 can be obtained. As a result, it is thought to be possible to obtain green light 14 with a higher output.

Although the wavelength conversion element having a length of 26 mm is illustrated in this embodiment, an effect of obtaining a higher output by increasing the NA increases as the length of the wavelength conversion element becomes shorter. For example, in the case of using a wavelength conversion element having a length of, e.g. 13 mm, an NA can be set to about 1.5 times (0.025) as large as the optimal condensing condition by utilizing a condenser lens of f10. In an exemplary case where the condensed position of the infrared light 11 is set at an inner position at 0.5 mm from the incident surface 16 of the wavelength conversion element 13 in this way, the intensity of ultraviolet light generated in the second half of the wavelength conversion element 13 can be reduced by about 75% and, simultaneously, a comparable output of the green light 14 can be obtained.

The green light 14 with an output of 4.3 W could be obtained without causing the crystal destruction of the wavelength conversion element by employing the above construction, but the following measure may also be taken to perform a wavelength conversion for a higher output.

Specifically, the absorption of the green light 14 by the ultraviolet light cannot be completely prevented even if the condensed position of the infrared light 11 is displaced toward the incident surface 16 from the central position of the wavelength conversion element 13 as described above. This is thought to result from the fact that the infrared light 11 and the green light 14 are condensed in the second half of the wavelength conversion element 13 by a thermal lens effect produced by the absorption of the green light 14 and, accordingly, the light intensity of the ultraviolet light increases.

Accordingly, in order to obtain high-output green light 14 by alleviating the above thermal lens effect, it is further desirable to form an elliptical beam by changing the NA in the longitudinal and lateral directions (two axis directions perpendicular to a propagation direction) of the incident infrared light 11. In this way, the temperature gradient of the wavelength conversion element 13 produced in one of the longitudinal and lateral directions in which the NA is larger becomes smaller than that of the wavelength conversion element 13 produced in the other direction in which the NA is smaller. As a result, a self-focusing effect by the thermal lens effect can be reduced, wherefore the focusing positions of the infrared light 11 and the green light 14 can be displaced in the longitudinal and lateral directions. Thus, by using the elliptical beam, it can be suppressed that the infrared light 11 and the green light 14 are condensed at one position. Therefore, the crystal destruction of the wavelength conversion element 13 can be made difficult to occur by reducing the peak light intensities of the green light 14, the infrared light 11 and the ultraviolet light.

In the above embodiment, the output of the green light 14 can be increased by enlarging the beam cross-sectional area of the infrared light 11 passing through the wavelength conversion element 13 (polarization reversal section 20). Generally, the wavelength conversion element 13 can be made larger than 10 mm in the width direction, but the dimension thereof in the thickness direction is limited to about several mm. Accordingly, the beam cross-sectional area of the infrared light 11 passing through the wavelength conversion element 13 is also limited in the thickness direction. Here, if an elliptical beam is used, the cross-sectional area of the beam passing through the wavelength conversion element 13 can be increased while the beam is formed to have a large area in the width direction and have a small area in the thickness direction. Thus, high-output green light 14 can be obtained. Specifically, it is possible to use an elliptical beam whose major axis extends in the width direction of the wavelength conversion element 13 and whose minor axis extends in the thickness direction of the wavelength conversion element 13. If the major axis of the ellipse is set to be 1.1 times as large as the minor axis, the cross-sectional area is also increased by 10%. In proportion to these, a maximum light intensity comparable to the one in the case of using a circular beam can be obtained, wherefore it is thought to be possible to increase the maximum output of the green light 14 by 10%.

Further, by condensing the infrared light 11 with an astigmatic difference so that the condensed position differs in the longitudinal and horizontal directions, the power density of the infrared light 11 at a focus can be reduced. Thus, even if the infrared light 11 and the green light 14 are condensed by the thermal lens effect in the second half of the wavelength conversion element 13, the condensed position differs in the longitudinal and lateral directions, whereby the thermal lens effect can be alleviated by suppressing the concentration of the light intensity at one position. Hence, the output of the green light 14 that serves as a threshold value for causing the crystal destruction of the wavelength conversion element 13 can be increased. Also in the case where an astigmatic difference is given in a radial direction of the wavelength conversion element 13, the concentration of the light intensity at one position can be avoided and similar effects can be obtained.

Elliptical beams or beams with an astigmatic difference in the longitudinal and horizontal directions or the radial direction can alleviate the concentration of light intensity at one position regardless of the condensed position. Thus, even if the condensed position is, for example, near the center of the element, high-output green light 14 can be obtained by using an elliptic beam or a beam with an astigmatic difference in the longitudinal and horizontal directions or the radial direction.

A Gaussian beam in which light intensity is locally increased in the center of a beam cross section can be used as the infrared light 11, but it is more preferable to use a flat beam, a doughnut beam or a beam including a high-order lateral mode. In other words, by causing one of these beams as a fundamental wave to be incident on the wavelength conversion element 13, heat generating positions in the beam cross section can be distributed. Thus, high-output green light 14 can be obtained while the crystal destruction of the wavelength conversion element 13 is further effectively suppressed. The output of the green light 14 can be increased at least by 10% or more by using such infrared light 11 that the maximum light intensity at the condensed position in the beam cross section is 90% or less of that of a Gaussian beam which satisfies the optimal condensing condition of this output.

At the condensed position where the beam diameter of the infrared light 11 is smallest, the light intensity increases and ultraviolet light is more easily generated. Thus, it is preferable to reduce the generation of the ultraviolet light and reduce the absorption of the green light 14 by the ultraviolet light by increasing the beam diameter at the condensed position of the infrared light 11.

Figure 21:
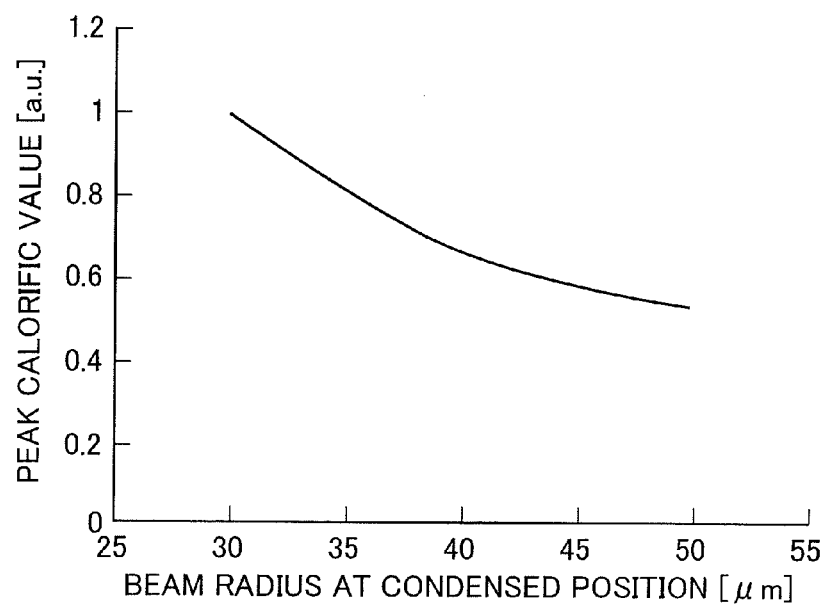
FIG. 21 is a graph showing a relationship between a beam radius at a condensed position and a peak calorific value.

FIG. 21 is a graph showing a relationship between a beam radius and a peak calorific value when the condensed position of the infrared light 11 is set in the central part of the wavelength conversion element 13. The beam radius is the one at the condensed position of the infrared light 11 and the peak calorific value is the one when green light 14 of 2 W was outputted. As can be understood from FIG. 21, the larger the beam radius of the infrared light 11 at the condensed position, the smaller the calorific value of the wavelength conversion element. Accordingly, the output of the green light 14 can be increased as the beam radius of the infrared light 11 at the condensed position is increased. Further, since the calorific value can be reduced and the temperature distribution in the wavelength conversion element can be reduced as the beam diameter of the infrared light 11 at the condensed position is increased, an effect of preventing a reduction of the wavelength conversion efficiency resulting from the temperature distribution can also be obtained.

Specifically, various methods can be thought to increase the beam diameter of the infrared light 11 at the condensed position. For example, it is thought to increase the beam diameter at the condensed position with M2 kept constant. However, since the NA decreases in this case, the beam diameter of the infrared light 11 in the second half of the wavelength conversion element 13 where the crystal destruction is likely to occur does not change very much and the effect of increasing the output of the green light 14 is small. On the contrary, in the case of increasing M2, the beam diameter of the infrared light 11 can be increased with the NA kept constant. Thus, the effect of increasing the output of the green light 14 can be effectively obtained. Therefore, it is desirable to increase M2 as a method for increasing the beam diameter of the infrared light 11.

In the case of simply increasing the beam diameter, the light intensity is drastically reduced in the entire wavelength conversion element 13 and, hence, the conversion efficiency is drastically reduced. As described above, the crystal destruction of the wavelength conversion element 13 results from an increase in the light intensity of light absorbed by sum-frequency light (ultraviolet light) out of light (green light) generated in the wavelength conversion element. Accordingly, a highly efficient wavelength conversion is possible and the output of the green light can be increased by increasing the beam diameter of the infrared light 11 in the second half of the wavelength conversion element 13 where the absorption by the sum-frequency light increases to suppress the absorption of the green light 14 by the sum-frequency light while reducing the beam cross section of the infrared light 11 at the side of the incident surface 16 of the wavelength conversion element 13 where the absorption by the sum-frequency light is small to effectively ensure the conversion efficiency of the green light 14.

In this embodiment, since electric field intensity in the wavelength conversion element can be increased when the infrared light 11 is emitted by the pulse oscillation of the laser light source 10, the wavelength conversion efficiency proportional to the electric field intensity can also be improved. Further, in the case of emitting the infrared light 11 by pulse oscillation, the output of the infrared light 11 in the second half of the wavelength conversion element 13 can be suppressed to a low level, the generation of the ultraviolet light can be reduced in proportion to infrared light intensity and the output of the green light 14 that serves as a threshold value for causing the crystal destruction can be increased.

In the case of performing a wavelength conversion using the infrared light 11 emitted by pulse oscillation, not only the conversion efficiency into the green light 14, but also that into the ultraviolet light are improved since peak light intensity can be increased even if an average output of the infrared light 11 is low. Accordingly, in this embodiment employing the method for reducing the absorption of the green light 14 by the ultraviolet light, the reduction of the wavelength conversion efficiency by the absorption of the green light 14 can be more effectively suppressed and the output of the green light 14 can be more increased than in the case where the infrared light 11 is emitted in the form of continuous light.

In this embodiment is illustrated the construction for obtaining a second harmonic, which is green light, using infrared light as a fundamental wave. Here, also when a fundamental wave having a wavelength of 700 nm or longer and 1200 nm or shorter is incident on the wavelength conversion element to generate a second harmonic, a third harmonic generated as a sum-frequency light of the fundamental wave and the second harmonic is known to cause the absorption of the second harmonic. If the wavelength converter according to this embodiment is employed also in the case of performing such a wavelength conversion, a high-output second harmonic can be obtained while the crystal destruction of the wavelength conversion element is suppressed.

Also when a fundamental wave having a wavelength of 450 nm or longer and 800 nm or shorter is incident on the wavelength conversion element to generate a second harmonic, the second harmonic is known to absorb the fundamental wave. The wavelength converter shown in FIG. 9 can reduce the peak light intensity of the second harmonic in the second half of the wavelength conversion element 13 to half or less as compared with the wavelength converter shown in FIG. 1 (see FIGS. 6 and 12), a high-output second harmonic can be obtained while the crystal destruction of the wavelength conversion element is suppressed also in the case of performing the above wavelength conversion. Also when a fundamental wave having a wavelength of 1200 nm or longer and 1600 nm or shorter is incident on the wavelength conversion element to generate a second harmonic, a fourth harmonic obtained by wavelength converting the second harmonic absorbs the second harmonic, but the wavelength converter shown in FIG. 9 can be similarly effectively utilized.

Further, when a fundamental wave having a wavelength of 1200 nm or longer and 2000 nm or shorter is incident on the wavelength conversion element to generate a fourth harmonic, a fifth harmonic generated as sum frequency light of the fundamental wave and the fourth harmonic is known to cause the absorption of the fourth harmonic. Furthermore, when a fundamental wave having a wavelength of 1200 nm or longer and 2000 nm or shorter is incident on the wavelength conversion element to generate both a second harmonic and a third harmonic, a fifth harmonic generated as sum-frequency light of the second harmonic and the third harmonic is known to cause the absorption of the third harmonic. Therefore, in these cases, the wavelength conversion element shown in FIG. 9 can also be effectively utilized.

A wavelength conversion element composed of a nonlinear optical crystal such as lithium niobate or lithium tantalate has such a property that a phenomenon occurring in the wavelength conversion element differs depending on a difference in a composition ratio of the crystal, the type of a dopant, the doped amount of the dopant or the wavelength of the incident fundamental wave. Specifically, harmonic absorption, two-photon absorption and the like occur in wavelength conversion elements in some cases and the wavelength conversion element shown in FIG. 9 can be effectively utilized also in these cases.

Figure 12:
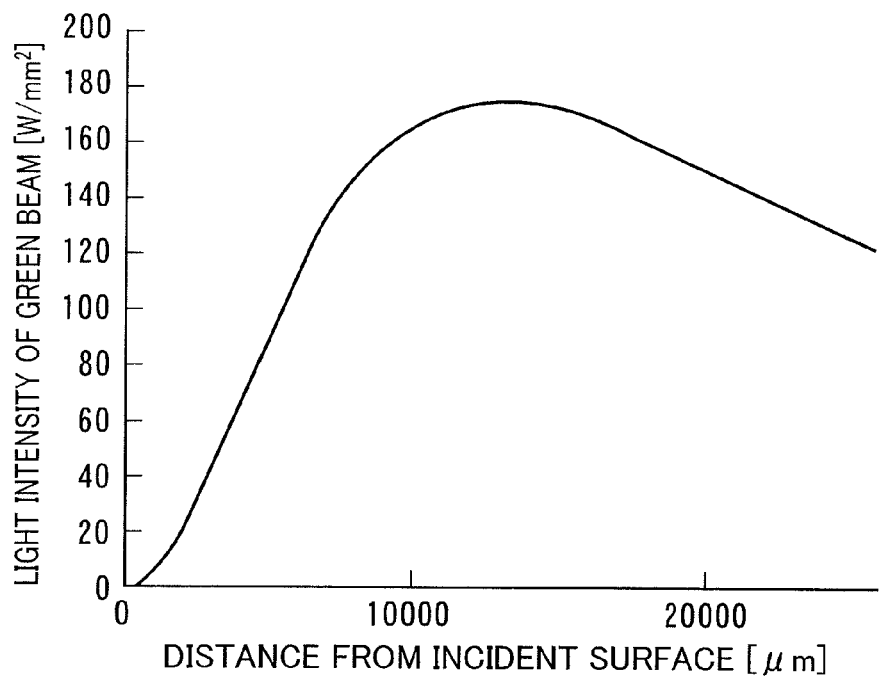
FIG. 12 is a graph showing a relationship between light intensity of green light and a distance from the incident surface in the wavelength conversion element shown in FIG. 9.

In other words, as can be understood from FIGS. 6 and 12, the light intensity of the second harmonic can be more reduced in the wavelength converter shown in FIG. 9 as compared with the construction shown in FIG. 1. Light absorption varies depending on the composition of a material used for the wavelength conversion element 13 and the wavelength of light to be wavelength converted. However, according to the wavelength converter shown in FIG. 9, it is possible to reduce the heat generation of the wavelength conversion element 13 and obtain high-output green light 14 in all cases where the light absorption amount is reduced by reducing the light intensity of light that is a second harmonic of an incident fundamental wave. Here, the two-photon absorption of the second harmonic can be, for example, cited as the light absorption for reducing the light absorption amount by reducing the light intensity of the second harmonic. In other words, in the case of using such a wavelength converting material as to cause two-photon absorption for light that becomes a second harmonic, a higher output can be obtained by the wavelength converter shown in FIG. 9.

As can be understood from FIGS. 6 and 12, the light intensity of the third harmonic can also be reduced in the wavelength converter shown in FIG. 9. Although light absorption varies depending on the composition of the material used for the wavelength conversion element 13 and the wavelength of the light, the heat generation of the wavelength conversion element 13 can be reduced and high-output green light 14 can be obtained according to the wavelength converter shown in FIG. 9 in all cases where the light absorption amount is reduced due to a reduction of the light intensity of the light as the third harmonic generated as the sum-frequency light of the fundamental wave and the second harmonic. Here, in the case of using such a wavelength converting material as to produce two-photon absorption of a third harmonic, for example, as light absorption for reducing the light absorption amount due to the reduction of the light intensity of the third harmonic, a higher output can be obtained by the wavelength converter shown in FIG. 9.

Figure 22:
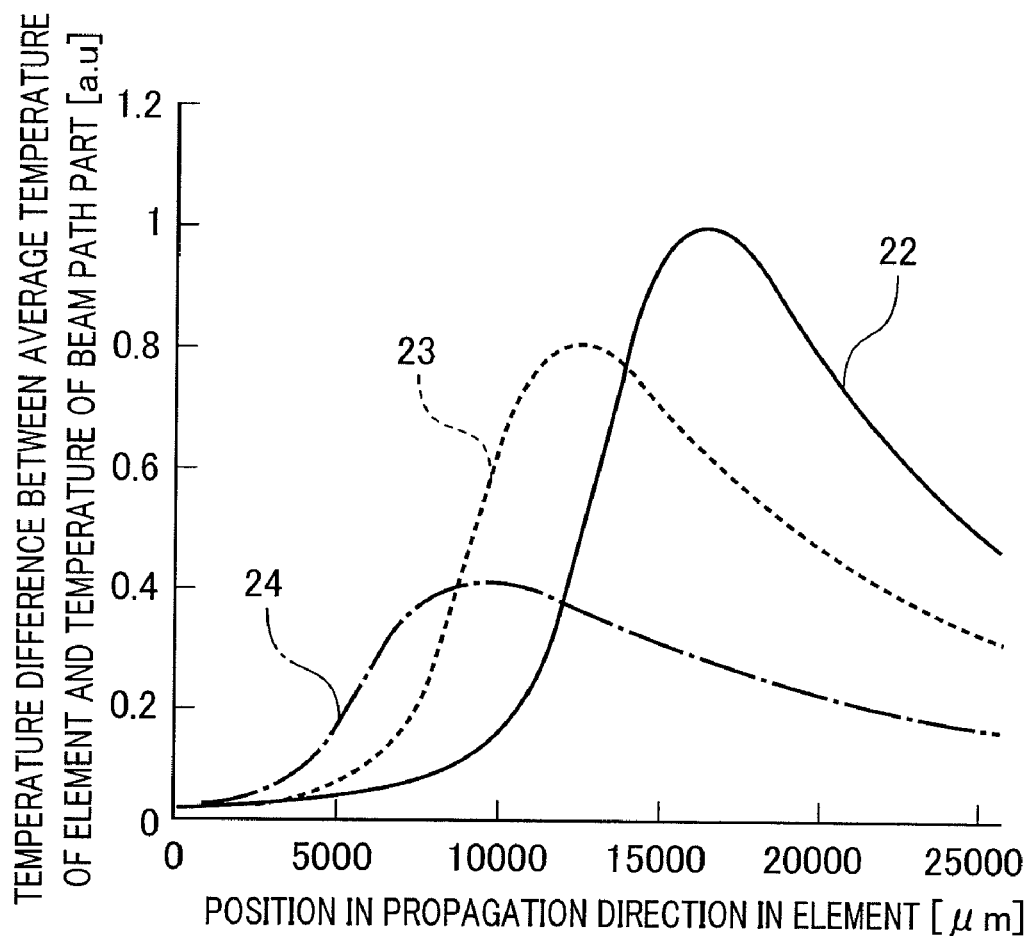
FIG. 22 is a diagram showing a relationship between a temperature difference between an element average temperature and temperature of a beam path part and a position in the wavelength conversion element.

FIG. 22 is a graph showing a relationship between a temperature difference between the average temperature of the wavelength conversion element and the temperature of a beam path part and the position in the wavelength conversion element. For example, when the two-photon absorption of the second harmonic largely contributes to the crystal destruction of the wavelength conversion element, the temperature difference between the average temperature and the temperature of the beam path part distributes as shown in FIG. 22. Indicated by 22 in FIG. 22 is a temperature difference in the case where the infrared light 11 is condensed with an optimal beam diameter in the center of the wavelength conversion element 13. Indicated by 23 is a temperature difference when the distance between the condensed position of the infrared light 11 and the incident surface 16 of the wavelength conversion element 13 is 35% of the length of the wavelength conversion element 13. Indicated by 24 is a temperature difference when the distance between the condensed position of the infrared light 11 and the incident surface 16 of the wavelength conversion element 13 is 20% of the length of the wavelength conversion element 13.

With reference to FIG. 22, since the temperature difference 23 is lower than the temperature difference 22 by about 20%, the wavelength converter of FIG. 9 can increase the output of the green light 14 by about 10% or more as compared with the wavelength converter of FIG. 1. Further, since the temperature difference 24 is lower than the temperature difference 22 by about 60%, the wavelength converter of FIG. 9 can increase the output of the green light 14 by about 30% or more as compared with the wavelength converter of FIG. 1.

A bulk-type wavelength conversion element or a slab waveguide-type wavelength conversion element can be used as the wavelength conversion element according to this embodiment. The bulk-type wavelength conversion element is shown in this embodiment. A case using a slab waveguide-type wavelength conversion element is described below.

The slab waveguide-type wavelength conversion element is formed with a waveguide having a cross section long in one direction (hereinafter, called a "longer direction") orthogonal to the optical axis of infrared light and short in another direction (hereinafter, called a "shorter direction") orthogonal to the longer direction. In the case of using this slab waveguide-type wavelength conversion element, infrared light is condensed on an incident surface of the wavelength conversion element with respect to the shorter direction. On the other hand, with respect to the longer direction, the infrared light has been conventionally caused to be incident substantially as parallel light on the incident surface of the slab waveguide-type wavelength conversion element without being condensed very much. Since the infrared light 11 is condensed at the side closer to the incident surface than to the central position of the wavelength conversion element in this embodiment as described above, a wavelength conversion with a higher output than before is possible. Particularly, since light intensity is easily increased in the slab waveguide-type wavelength conversion element than in the bulk-type wavelength conversion element, a wavelength conversion with an output exceeding several W is possible by causing the infrared light to be so incident that the infrared light is condensed at a position close to the incident surface of the wavelength conversion element with respect to the longer direction. Further, since a heat generating part expands in the longer direction in the case of using the slab waveguide-type wavelength conversion element, it is suitable for heat radiation.

Conventionally, upon using a slab-type wavelength conversion element, local heat generation was reduced by increasing a beam diameter in the longer direction and reducing light intensity in the wavelength conversion element, whereby the output of green light was increased. However, similar to the bulk-type wavelength conversion element, light intensity is drastically reduced in the entire wavelength conversion element when the beam diameter is merely increased. Thus, conversion efficiency is drastically reduced. On the other hand, as in this embodiment, the crystal destruction of the wavelength conversion element results from an increase in the light intensity of light absorbed by sum-frequency light (ultraviolet light) out of light (green light) generated in the wavelength conversion element. Accordingly, the absorption of the green light by the sum-frequency light is suppressed by increasing the beam diameter of the infrared light in the second half of the wavelength conversion element where the absorption by the sum-frequency light increases while reducing the beam cross section of the infrared light at the incident surface side of the wavelength conversion element where the absorption by the sum-frequency light is small to effectively ensure the conversion efficiency of the green light, whereby a highly efficient wavelength conversion becomes possible and the output of the green light can be increased.

Second Embodiment

Figure 23:
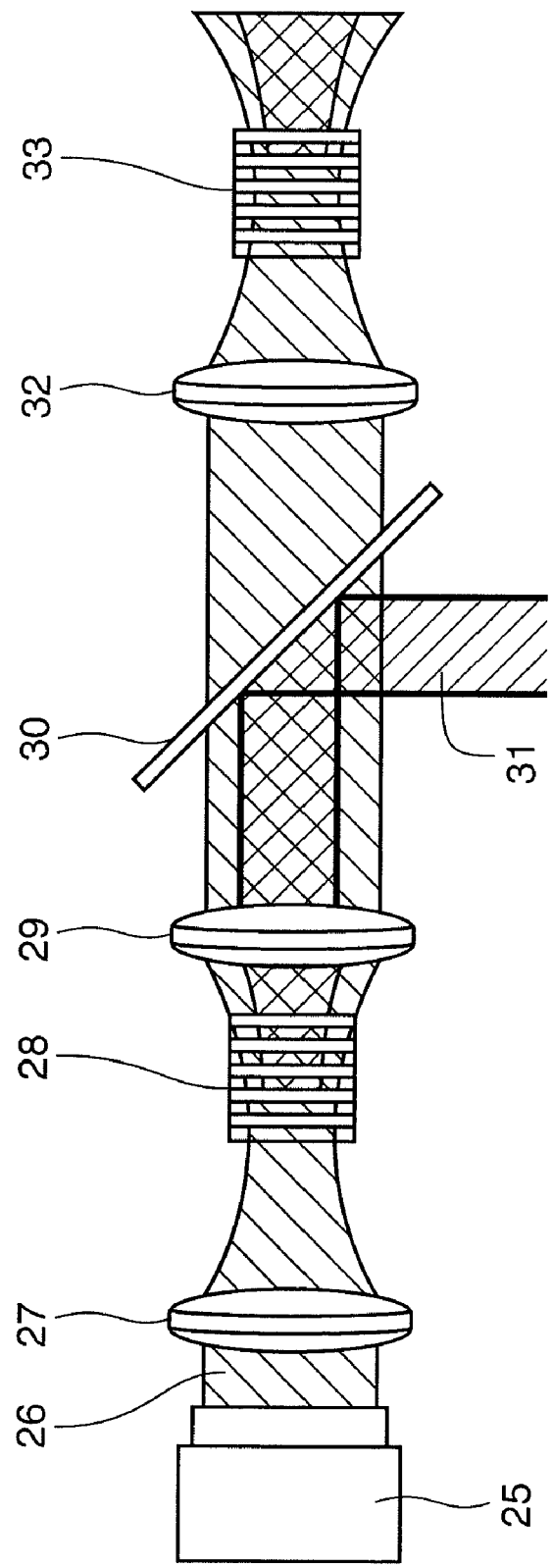
FIG. 23 is a diagram of a wavelength converter according to a second embodiment of the invention.

FIG. 23 is a schematic diagram showing a wavelength converter according to a second embodiment of the present invention. A plurality of wavelength conversion elements are used in the second embodiment. Thus, a fundamental wave coming out from the first wavelength conversion element without being wavelength converted can be wavelength converted again by the second wavelength conversion element. Therefore, wavelength conversion efficiency can be improved as compared with a wavelength converter using only one wavelength conversion element.

Specifically, the wavelength converter using two wavelength conversion elements is shown in FIG. 23. This wavelength converter is provided with a laser light source 25, a condenser lens 27 for condensing infrared light 26 from this laser light source 25, a wavelength conversion element 28 for converting the infrared light 26 condensed by the condenser lens 27 into green light 31, a collimator lens 29 for converting light coming out from the wavelength conversion element 28 into parallel light, a separating mirror 30 for reflecting the green light 31 and transmitting the infrared light 26, a condenser lens 32 for condensing the infrared light 26 from the separating mirror 30, and a wavelength conversion element 33 for converting the infrared light 26 condensed by the condenser lens 32 into green light. The laser light source 25 and the condenser lens 27 have the same constructions as the laser light source 10 and the condenser lens 12 shown in the first embodiment (FIG. 9).

The infrared light 26 emitted from the laser light source 25 is condensed by the condenser lens 27 and incident on the wavelength conversion element 28. The green light and infrared light coming out from the wavelength conversion element 28 are converted into parallel light by the collimator lens 29. The green light is reflected by the separating mirror 30, whereas the infrared light passes through the separating mirror. The infrared light having passed through the separating mirror 30 is condensed by the condenser lens 32 and incident on the wavelength conversion element 33 to be wavelength converted again.

Specifically, the laser light source 25 emits the infrared light 26 of 10 W.

The wavelength conversion element 27 is made of lithium niobate and has a length of 26 mm as in the first embodiment. A condensed position of the infrared light 26 is set at an inner side at about 2 mm from an incident surface of the wavelength conversion element 27. As a result, green light of about 3 W and infrared light of about 7 W come out from the wavelength conversion element 27.

The infrared light of about 7 W left after the green light is separated by the separating mirror 30 is incident on the second wavelength conversion element 33. The wavelength conversion element 33 is made of lithium niobate and has a length of 26 mm similar to the wavelength conversion element 27. The infrared light is condensed at a position at about 4 mm from a lengthwise central position of the wavelength conversion element 33 toward an incident surface and at about 9 mm from the incident surface of the wavelength conversion element 33. As a result, green light of about 2.5 W comes out from the wavelength conversion element 33. The sum of the outputs of the green light coming out from the two wavelength conversion elements 27, 33 is 5.5 W.

This embodiment is characterized in that the two wavelength conversion elements 27, 33 are provided, the outputs of the infrared light incident on the first and second wavelength conversion elements 227, 33 differ from each other, and the different condensed positions of the infrared light are set for the respective wavelength conversion elements 27, 33 in accordance with these different outputs of the infrared light. As a result, the wavelength conversion efficiency of the entire wavelength converter can be increased.

It goes without saying that the wavelength conversion efficiency of the entire wavelength converter can be similarly improved by changing a condensed position of incident infrared light for each wavelength conversion element even in the case of using three or more wavelength conversion elements.

Further, it goes without saying that effects similar to those of this embodiment can be obtained by changing a condensed state for each optical path also in a wavelength converter including a plurality of optical paths in one wavelength conversion element.

Third Embodiment

Figure 24:
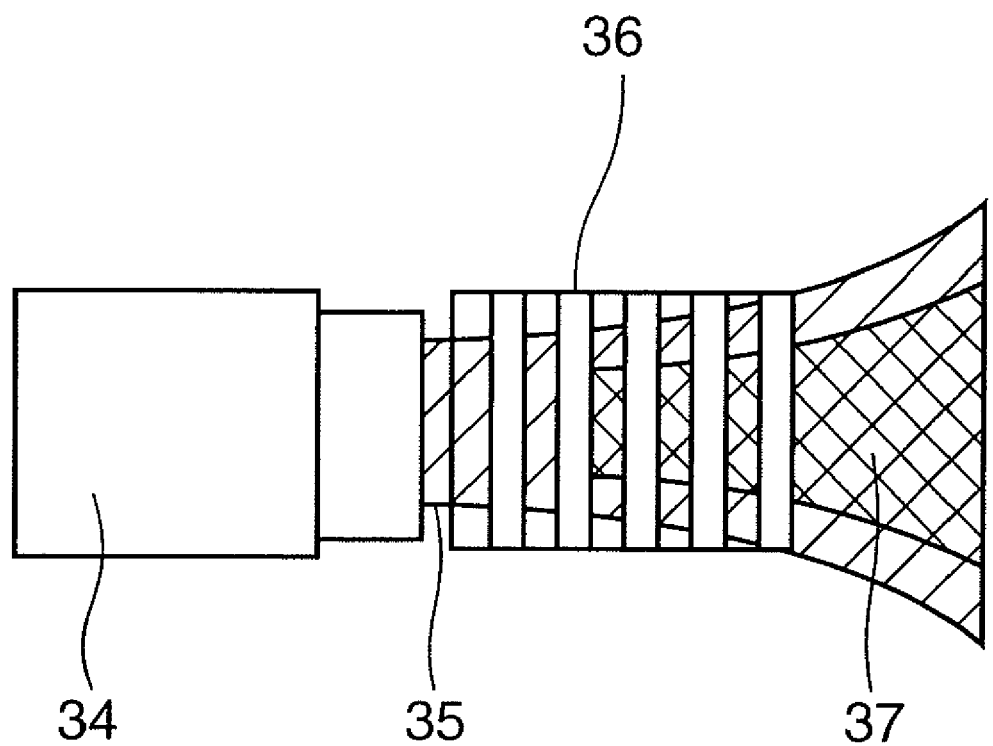
FIG. 24 is a diagram of a wavelength converter according to a third embodiment of the invention.

FIG. 24 is a schematic diagram showing a wavelength converter according to a third embodiment of the present invention. In the wavelength converter of this embodiment, infrared light 35 emitted from a laser light source 34 is incident on a wavelength conversion element 36 without via any lens to be converted into green light 37. Since the infrared light 35 is emitted as radiation light from the laser light source 34 in the wavelength converter according to this embodiment, the infrared light 35 is most condensed at an incident surface of the wavelength conversion element 36 and effects similar to the above embodiments can be displayed.

Since the number of parts can be reduced by omitting a member for condensing the infrared light 35 in this embodiment, a smaller device can be produced at a lower cost. Further, since an optical distance of the infrared light can be shortened in this embodiment, the miniaturization of the wavelength converter is possible. Furthermore, by directly joining the laser light source 34 and the wavelength conversion element 36, the stability of the green light output can be remarkably improved as compared with the case where the laser light source 34 and the wavelength conversion element 36 are connected via another construction.

More preferably, a GRIN lens may be disposed between the laser light source 34 and the wavelength conversion element 36. By doing so, the infrared light 35 can be condensed at an end surface of the GRIN lens. Thus, the condensed position of the infrared light 35 can be accurately positioned to the end surface of the wavelength conversion element 36 and the green light can be stably obtained by bringing the end surface of the wavelength conversion element 36 and that of the GRIN lens into contact with each other.

A solid-state laser such as a YAG laser with a high efficiency in oscillating the infrared light 35 or a fiber laser using a fiber doped with a rare-earth element such as Yb or Nd can be used as the laser light source 34.

Fourth Embodiment

Figure 25:
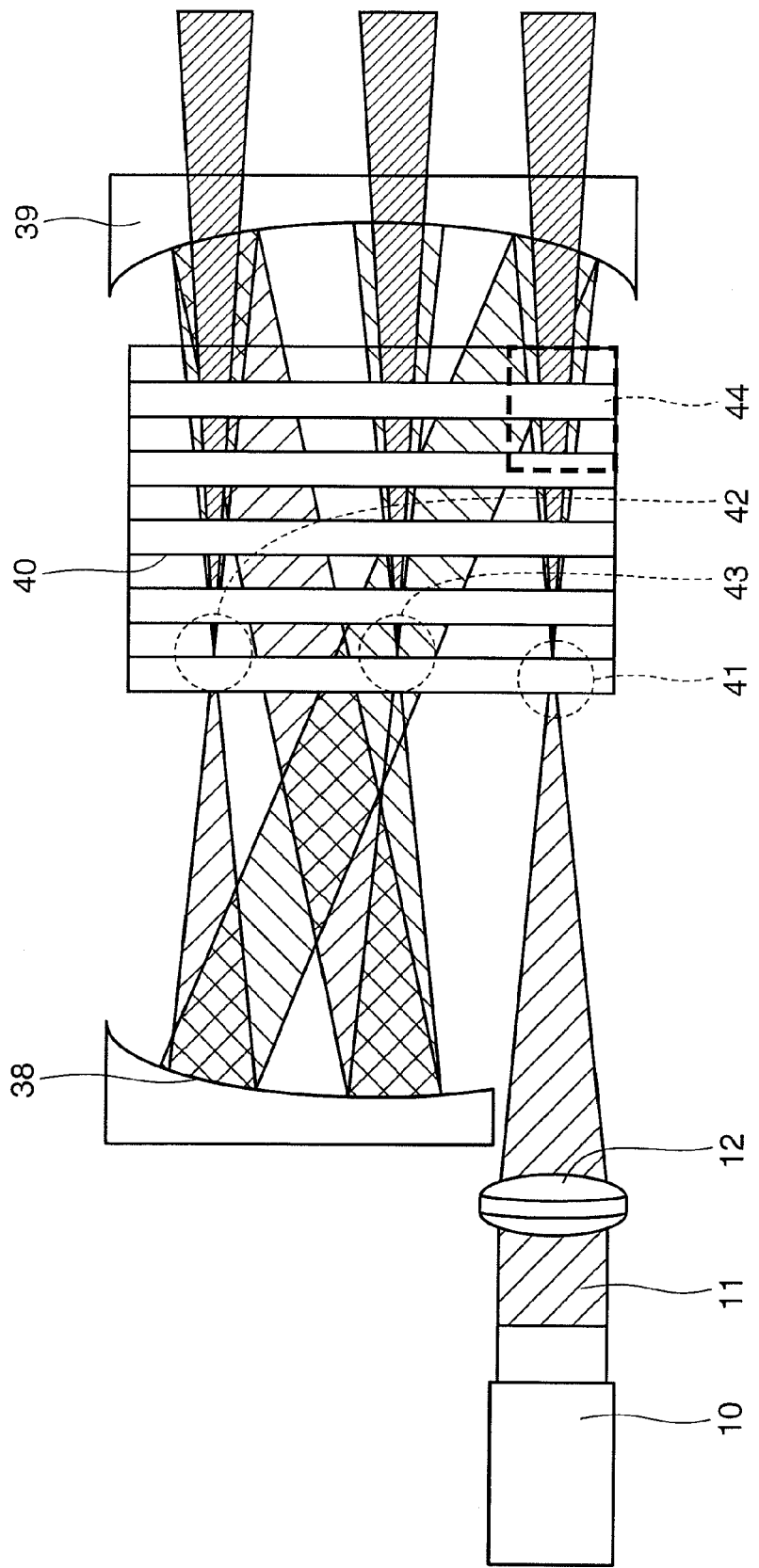
FIG. 25 is a diagram of a wavelength converter according to a fourth embodiment of the invention.

FIG. 25 is a schematic diagram showing a wavelength converter according to a fourth embodiment of the present invention. The wavelength converter of this embodiment is provided with a laser light source 10, a condenser lens 12 for condensing infrared light 11 from the laser light source 10, a wavelength conversion element 40 for converting the infrared light 11 condensed by the condenser lens 12 into green light, and a pair of concave mirrors 38, 39 arranged at the opposite sides of the wavelength conversion element 40.

In the wavelength converter according to this embodiment, the infrared light 11 emitted from the laser light source 10 is incident on the condenser lens 12 and then incident on the wavelength conversion element 40 arranged between reflection mirrors formed by the concave mirrors 38, 39.

Coating for reflecting both the infrared light and the green light is applied to the concave mirror 38. Further, coating for reflecting the infrared light and transmitting the green light is applied to the concave mirror 39.

A part of the infrared light 11 emitted from the laser light source 10 is converted into green light in the wavelength conversion element 40 and the infrared light left without being converted reciprocates between the concave mirrors 38 and 39 a plurality of times. In other words, a plurality of optical paths of the infrared light 11 passing through the wavelength conversion element 40 are set between the respective concave mirrors 38 and 39.

Specifically, a condensed position 41 of the infrared light 11 is set closer to an incident end than to a central position of the wavelength conversion element 40. Accordingly, in a first optical path from the laser light source 10 to the concave mirror 39, the occurrence of crystal destruction of the wavelength conversion element 40 can be suppressed even in the case of obtaining green light with an output of 1 W or higher. Thus, a reduction of a wavelength conversion efficiency in the optical path after the concave mirror 39 can be prevented. As a method for setting the condensed position 41 of the infrared light 11 near the incident surface of the wavelength conversion element 40, infrared light of about 1 W is caused to be incident on the wavelength conversion element 40 and the condensed position of the infrared light 11 and the temperature of the wavelength conversion element 40 are optimized to maximize the output of the green light in the first optical path. Thereafter, by displacing the wavelength conversion element 40 toward an emergent end, the condensed position of the infrared light 11 can be easily set at the incident side of the wavelength conversion element 40.

Next, the second optical path along which the infrared light reflected by the concave mirror 39 propagates from the concave mirror 38 toward the concave mirror 39 again is studied. If the output of the infrared light 11 from the laser light source 10 is high and the green light generated in the second optical path exceeds 1 W, a condensed position 43 of the second optical path is preferably set near the incident surface of the wavelength conversion element 40. In this way, the crystal destruction of the wavelength conversion element 40 can be suppressed in a part corresponding to the second optical path, with the result that high-output green light can be obtained.

Further, a third optical path along which the infrared light reflected by the concave mirror 39 in the second optical path is reflected by the concave mirror 38 to propagate toward the concave mirror 39 is studied. Similar to the first and second optical paths, a condensed position 42 is preferably set near the incident surface of the wavelength conversion element 40 also in the third optical path if green light generated in the third optical path exceeds 1 W. As a result, high-output green light can be obtained.

If green light of higher than 1 W is generated in the first optical path and such green light is not generated in the second and third optical paths, it is possible to set the condensed position 41 near the incident surface of the wavelength conversion element and set the condensed positions 42, 43 near the center of the wavelength conversion element 40. In this way, the wavelength conversion efficiency can be improved while the crystal destruction of the wavelength conversion element 40 is effectively prevented.

In order to prevent a reduction of the conversion efficiency in the second and succeeding optical paths, it is further preferable to suppress the green light output generated in the first optical path to 1 W or lower. For example, by forming no polarization reversal section in a part of the wavelength conversion element 40 indicated by 44 in FIG. 25, the wavelength conversion efficiency in the first optical path can be reduced. In this way, the green light output in the first optical path can be reduced.

Since the infrared light left without being wavelength converted in the first optical path can be wavelength converted a plurality of times in the second and third optical paths in this embodiment, a final reduction of the conversion efficiency is small even if the conversion efficiency in the first optical path is reduced. Further, since the wavelength conversion can be performed in the plurality of optical paths set in the wavelength conversion element 40 in this embodiment, a wavelength conversion with a far higher efficiency is possible than in the case where one optical path is set in the wavelength conversion element 40.

In the present invention, high-efficiency and high-output wavelength conversion is possible. Further, the beam degradation of the fundamental wave and light generated by wavelength conversion can be prevented by reducing a temperature increase of the wavelength conversion element in a beam diameter direction.

Further, in the present invention, it is possible to reduce a temperature distribution produced in a propagation direction of the fundamental wave and perform a stable wavelength conversion with a smaller output variation.

Figure 26:
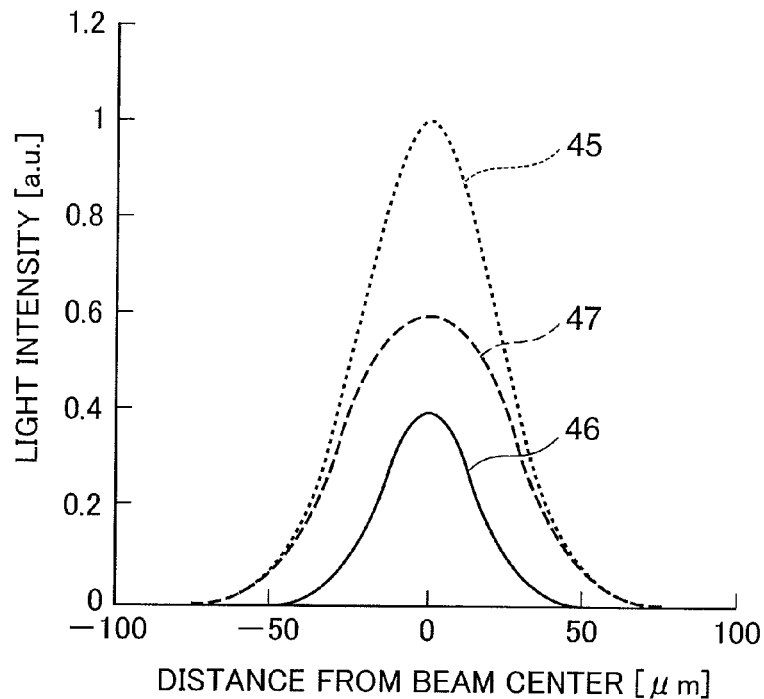
FIG. 26 is a graph showing light intensity distributions of infrared light and green light in the wavelength conversion element shown in FIG. 1.
Figure 27:
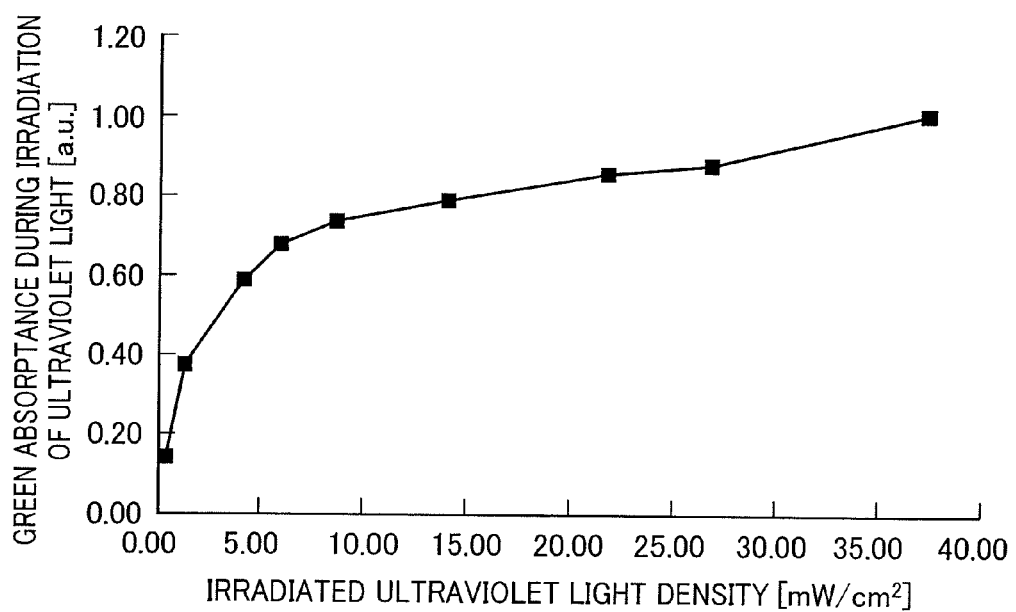
FIG. 27 is a graph showing a relationship between absorptance of green light and intensity of ultraviolet light in the wavelength conversion element shown in FIG. 1.

In the construction shown in FIG. 1 aimed to obtain a higher efficiency, the beam paths of the infrared light 2 and the green light 5 coincide in the wavelength conversion element 4. Thus, as shown in FIG. 26, light intensities 18, 20 of the infrared light 2 and light intensity 19 of the green light 5 respectively maximize in the beam centers. Accordingly, ultraviolet light generated more in proportion to the light intensities of the infrared light 2 and the green light 5 particularly increases in the beam centers. Since the generation amount of the ultraviolet light increases with the light intensity of the green light in this way, the green light 5 is absorbed by the ultraviolet light to a larger extent to cause crystal destruction. Further, as shown in FIG. 27, it was confirmed by an experiment that the absorptance of the green light 5 increased with the light intensity of the ultraviolet light. Accordingly, the crystal destruction is thought to be suppressed by reducing the overlap of the infrared light 2 incident on the wavelength conversion element 4 and the green light 5 generated in the wavelength conversion element 4. In FIG. 2, identified by 18 is the light intensity of the infrared light before incidence on the wavelength conversion element 4, by 19 is the light intensity of the green light 5 generated in the wavelength conversion element 4 and by 20 is the light intensity of the infrared light 2 after passage through the wavelength conversion element 4.

Fifth Embodiment

Figure 28:
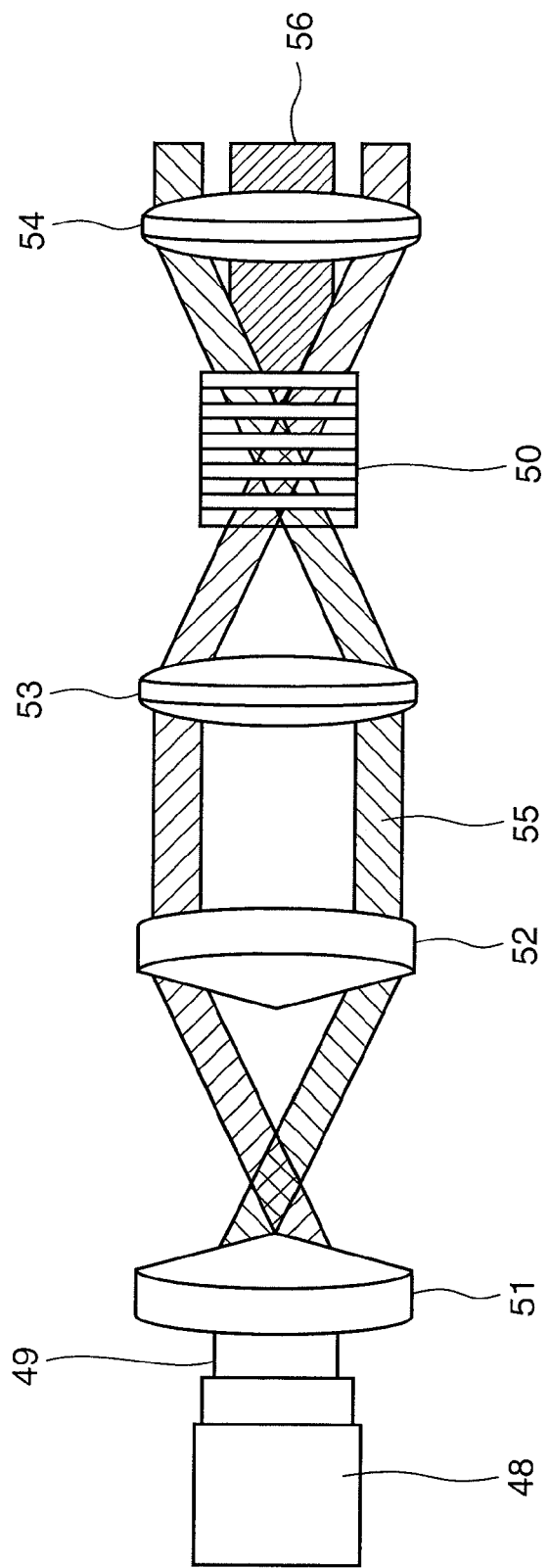
FIG. 28 is a diagram of a wavelength converter according to a fifth embodiment of the invention.

FIG. 28 is a schematic diagram showing a wavelength converter according to a fifth embodiment of the present invention. The wavelength converter according to the fifth embodiment is provided with a laser light source 48, a conical lens 51 for converting infrared light 49 from the laser light source 48 into a doughnut-shaped beam, a conical lens 52 for converting the infrared light 49 from the conical lens 51 into parallel light, a convex lens 53 for condensing the infrared light 49 from the conical lens 52, a wavelength conversion element 50 for converting the infrared light 49 condensed by the convex lens 53 into green light 56 and a convex lens 54 for converting the light coming out from the wavelength conversion element 50 into parallel light.

The infrared light 49 emitted from the laser light source 48 is incident on the two conical lenses 51, 52 facing each other, thereby being converted into the doughnut-shaped (ring-shaped) beam in which a part with high light intensity is moved from a beam center to a beam periphery. In other words, the infrared light 49 is converted into a beam in which a light intensity distribution in a beam cross section is skewed toward a peripheral part. This doughnut-shaped beam is condensed by the convex lens 53 to be incident on the wavelength conversion element 50. The infrared light 49 and the green light 56 coming out from the wavelength conversion element 50 are converted into parallel light by the convex lens 54.

Figure 29:
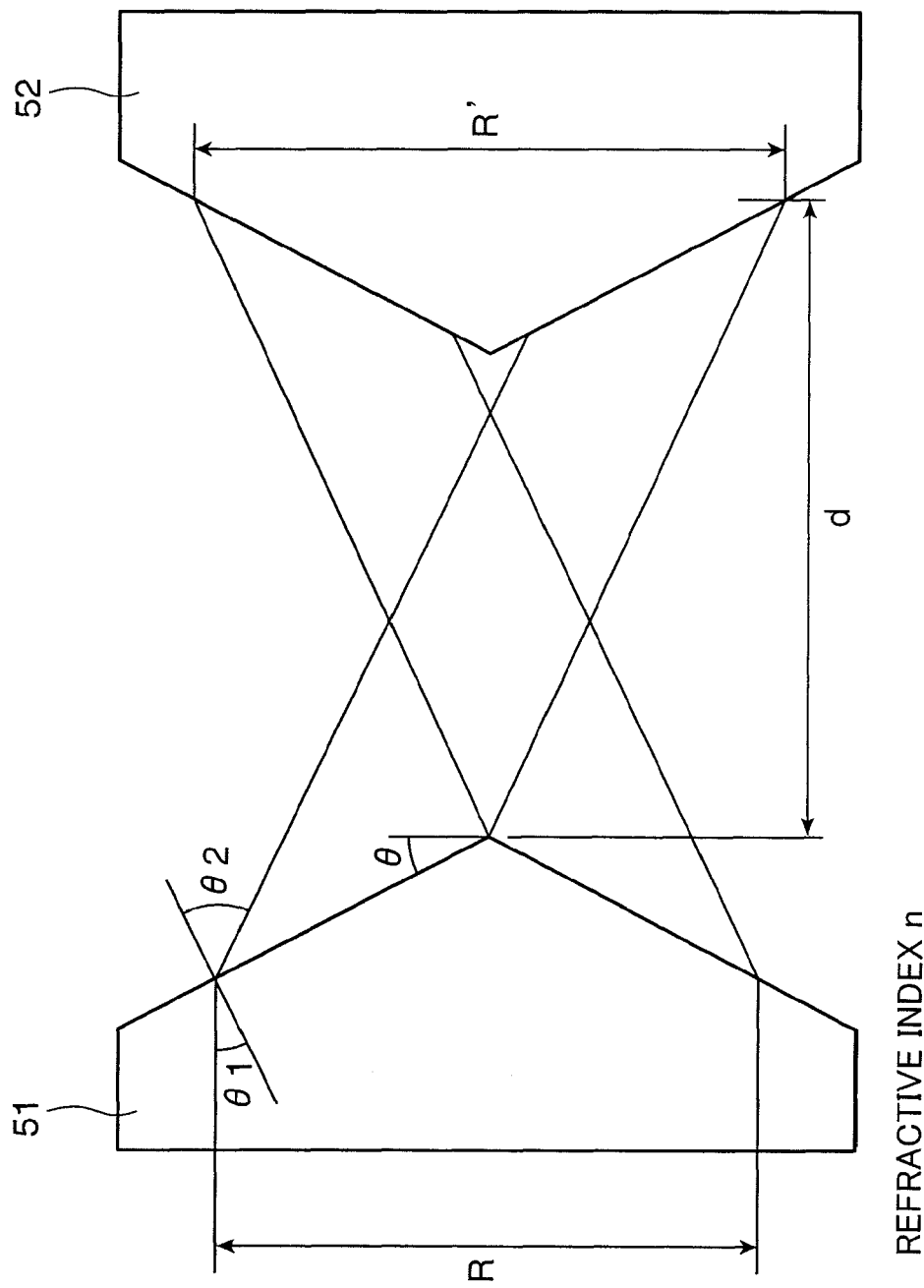
FIG. 29 is a diagram enlargedly showing a beam path between conical lenses in FIG. 28.
Figure 30:
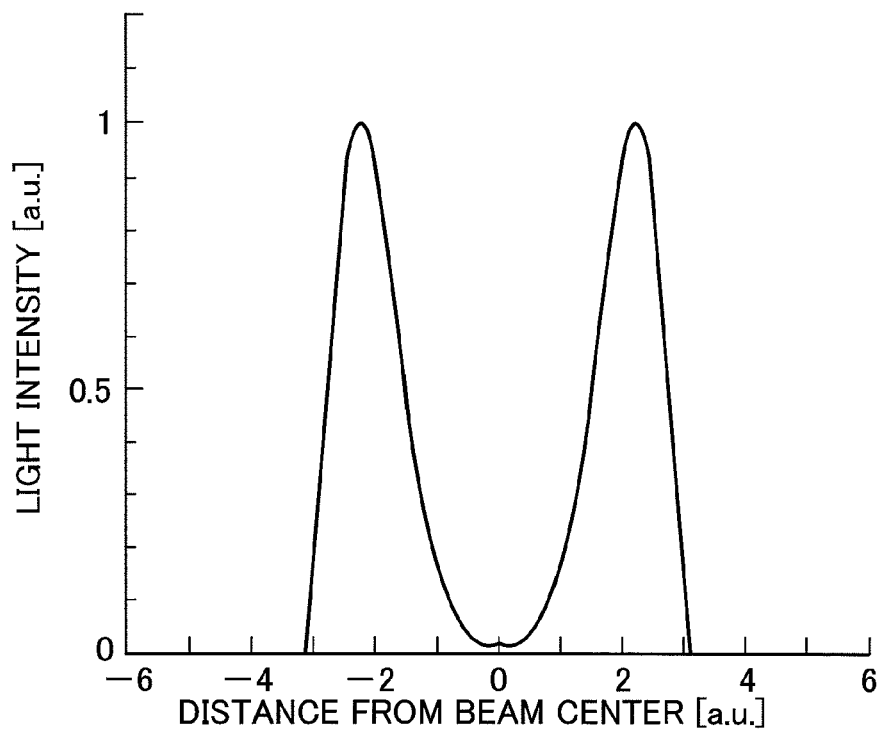
FIG. 30 is a diagram showing a light intensity distribution (R'=1.5R) of a beam having passed through the conical lenses shown in FIG. 28.

FIG. 29 is a schematic diagram showing conversions of the light intensity distribution of the infrared light by the conical lenses 51, 52. An angle of inclination of a conical surface and a refractive index of each of the conical lenses 51, 52 are set to $\theta$, $n$, and a distance between the both lenses 51, 52 is $d$. Since an output angle (interior angle) $\theta_1$ of the conical lens 51 is the angle of inclination $\theta$ of the conical surface, an output angle (exterior angle) $\theta_2$ of the conical lens 51 is $\sin^{-1}(n \times \sin \theta)$ and a beam diameter $R'$ of the infrared light 49 reaching the conical lens 52 is $d \times \tan(\sin^{-1}(n \times \sin \theta) - \theta)$. Thus, an arbitrary $R'$ can be obtained by changing the distance $d$ between the lenses. Further, a ratio of an inner diameter to an outer diameter of a doughnut part can be arbitrarily adjusted by adjusting $R'$. For example, when $d$ is set so that $R'$ is 1.5 R, a light intensity distribution of a fundamental wave incident on a spherical lens is as shown in FIG. 30. An infrared laser beam (doughnut beam) 55 having a doughnut-shaped light intensity distribution in this way is condensed by the convex lens 53 to be incident on the wavelength conversion element 50.

Figure 31:
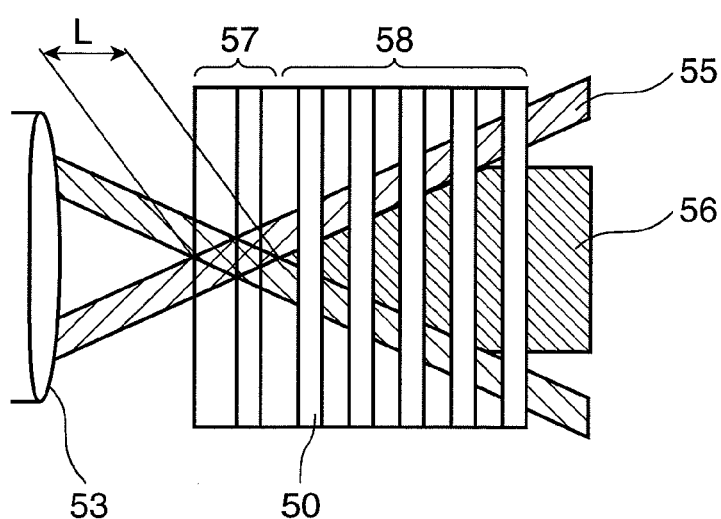
FIG. 31 is a diagram enlargedly showing the vicinity of a wavelength conversion element shown in FIG. 28.

Next, with reference to FIG. 31, a relationship between the infrared light and the green light in the wavelength conversion element 50 is described. In this embodiment, the doughnut beam 55 is condensed in a front region 57 of the wavelength conversion element 50. The doughnut beam 55 is known to have a high peak intensity in the beam center at a condensed position. In the wavelength conversion element 50, green light 56 having a peak intensity in the beam center is generated in the beam center of the doughnut beam 55 having a high peak intensity. The green light having a shorter wavelength than the infrared light has a smaller divergence angle than the infrared light and propagates inside the infrared light in a rear region 58 of the wavelength conversion element 50. Thus, in this embodiment, the absorption of the green light by ultraviolet light can be prevented by reducing the overlap of the green light and the infrared light. The green light generated in the region 58 has a divergence angle approximate to that of the infrared light, but has a lower peak light intensity at this output as compared with a Gaussian beam. Specifically, since the peak light intensity is 0.18 times as high as that of the Gaussian beam at the same output, for example, when $R'=1.5$ R, it is thought to be possible to perform a wavelength conversion without causing any crystal destruction even at the time of outputting green light of about 10 W.

Specifically, since the peak light intensity is high in the front region 57 of the wavelength conversion element 50, a wavelength conversion efficiency is higher than in the rear region 58 of the element, but crystal destruction in a beam central part where the light intensity concentrates easily occurs even at the time of low-output wavelength conversion. On the other hand, in the rear region 58 of the wavelength conversion element 50, crystal destruction is unlikely to occur even at the time of a high output, but the wavelength conversion efficiency is low due to a low light intensity. Thus, it is desirable to optimize the ratio of the front region 57 to the rear region 58 of the element according to a required output of the green light.

Although the method using the two lenses each with the conical portion is used in this embodiment, this is one method for converting a Gaussian beam into a doughnut beam and it goes without saying that another doughnut beam generation method can be used. However, by the doughnut beam generation method by the two conical portions facing each other, the length of a part indicated by L in FIG. 31 can be arbitrarily adjusted by adjusting the distance between the conical portions. In other words, the ratio of the front region 57 to the rear region 58 of the element can be optimized. Therefore, the conversion efficiency can be optimized for an arbitrary green light output by adjusting the distance between the conical lenses.

In the case of quasi phase matching using a wavelength conversion element with a periodically polarization-reversed structure, a phase matching period is shorter in the rear region 58 of the element since a wave front is inclined with respect to a polarization reversal period in a part where the light intensity of the infrared light is high. Thus, it is preferable to independently adjust the element temperature in the front region 57 and rear region 58. Specifically, it is possible to provide a heater in each of the front and rear regions 57, 58 and adjust temperature using these heaters. As also shown in FIG. 31, the polarization reversal period of the rear region 58 can be set to be shorter than in the front region 57 according to a difference of the phase matching period.

The infrared light 49 is preferably emitted by pulse oscillation of the laser light source 48. By doing so, an electric field intensity in the wavelength conversion element 50 can be increased. Here, since the wavelength conversion efficiency when a non-linear optical crystal is used is proportional to an electric field intensity of a fundamental wave, it is possible to increase not only a maximum output of the wavelength conversion by the wavelength conversion element 50, but also the wavelength conversion efficiency by emitting the infrared light 49 by pulse oscillation.

In the case of using a wavelength conversion element formed with a polarization-reversed structure by applying an electric field, the formation range of the polarization-reversed structure is limited. Thus, the width of a region where the infrared light 49 has to be irradiated to obtain a uniform wavelength conversion efficiency is only about 200 μm. Thus, in the case of using a doughnut beam having a beam diameter exceeding 200 μm, efficiency during the wavelength conversion decreases. In order to avoid this, a cylindrical lens is preferably used to convert a beam to have an elliptical shape when a doughnut beam having a beam diameter exceeding 200 μm is incident.

By using lithium niobate or lithium tantalate doped with magnesium oxide as the wavelength conversion element 50 of this embodiment, a high-efficiency wavelength conversion is possible.

Figure 32:
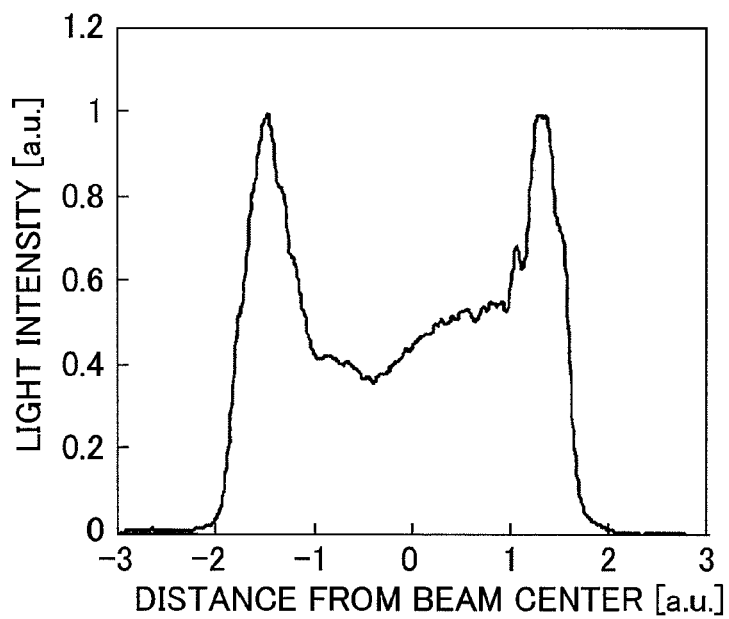
FIG. 32 is a graph showing a measurement result of a light intensity distribution of infrared light having passed through the wavelength conversion element shown in FIG. 28.
Figure 33:
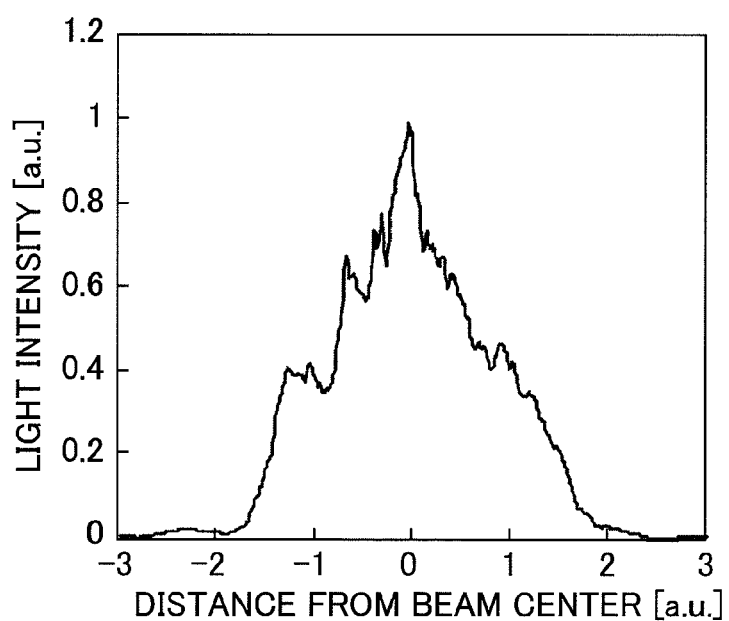
FIG. 33 is a graph showing a measurement result of a light intensity distribution of green light generated by the wavelength conversion element shown in FIG. 28.

The result of an experiment using the wavelength conversion element according to this embodiment is described. The wavelength conversion element 50 was made of lithium niobate doped with magnesium oxide, had a length of 26 mm and was formed with a polarization-reversed structure with a period of 7 μm. The laser light source 48 emitted infrared light having a wavelength of 1064 nm and the temperature of the wavelength conversion element 50 was adjusted to maximize the output of the green light 56. FIG. 32 is a graph showing a light intensity distribution of the infrared light coming out from the wavelength conversion element 50. FIG. 33 is a graph showing a light intensity distribution of the green light 56 generated in the wavelength conversion element 50. As shown in FIGS. 32 and 33, it was confirmed to obtain the green light 56 with a high light intensity in the beam center by causing the doughnut beam 55 with a high light intensity in a beam peripheral part to be incident on the wavelength conversion element 50. As described above, in the wavelength converter according to this embodiment, the absorption of the green light by the ultraviolet light can be reduced by reducing the overlap of the infrared light and the green light upon obtaining high-output green light. Therefore, it is thought to be possible to obtain high-output green light without causing any crystal destruction.

In the wavelength converter shown in FIG. 1, there is a problem that the temperature of the wavelength conversion element 4 varies by ±0.3° to reduce the wavelength conversion efficiency to 80% or lower when the length of the wavelength conversion element 4 is 26 mm. However, in the wavelength converter according to this embodiment, the temperature stability of the wavelength conversion efficiency is known to be also improved simultaneously with the avoidance of the crystal destruction.

Figure 34:
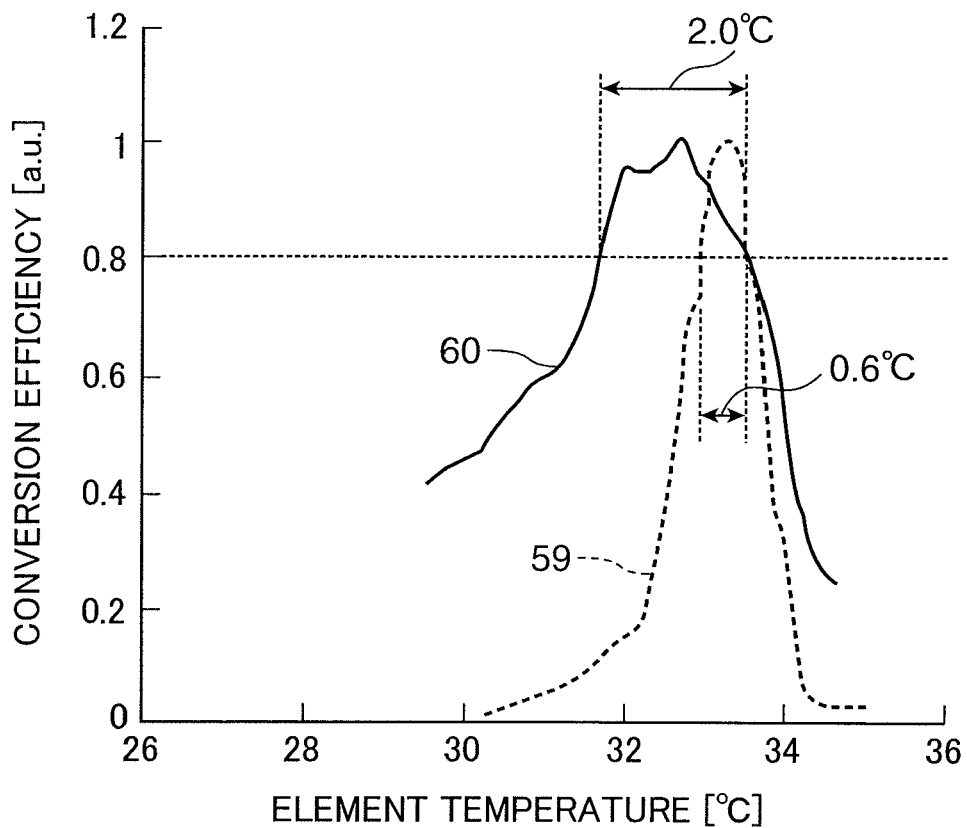
FIG. 34 is a graph showing a relationship between a wavelength conversion efficiency and element temperature in the case of using the wavelength converter shown in FIG. 28.

FIG. 34 is a graph showing relationships between the wavelength conversion efficiency and the element temperature. A line 59 indicates the relationship between the wavelength conversion efficiency and the element temperature in the wavelength converter shown in FIG. 1. On the other hand, a line 60 indicates the relationship between the wavelength conversion efficiency and the element temperature in the wavelength converter according to this embodiment. It can be understood that the temperature range where the wavelength conversion efficiency exceeds 80% of that at an optimal temperature is about 0.6° C. in the line 59, but is enlarged to about 2° C. in the line 60.

Sixth Embodiment

Figure 35:
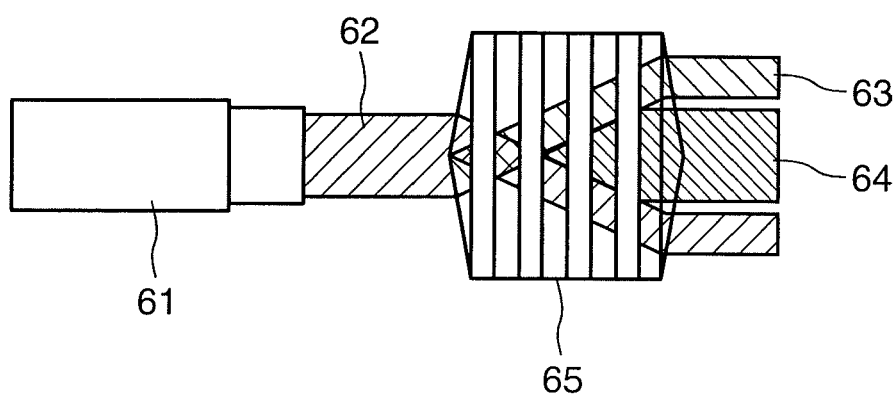
FIG. 35 is a schematic diagram showing a wavelength converter according to a sixth embodiment of the invention.

FIG. 35 is a schematic diagram showing a wavelength converter according to this embodiment. In a wavelength converter according to this embodiment, conical portions are formed at the opposite end surfaces of a wavelength conversion element 65 instead of the conical lenses 51, 52 shown in the fifth embodiment.

Specifically, the wavelength converter is provided with a laser light source 61 and the wavelength conversion element 65 for converting infrared light 62 from the laser light source 61 into green light 64.

The laser light source 61 emits the infrared light 62 in the form of a parallel Gaussian beam.

The wavelength conversion element 65 has the conical portions on incident and emergent surfaces. The conical portion at the incident side converts the infrared light 62 from the laser light source 61 into a doughnut-shaped beam and condenses this beam. On the other hand, the conical portion at the emergent side converts the doughnut-shaped infrared light 62 coming out from the wavelength conversion element 65 into parallel light. Thus, by causing the infrared light to be so incident that the vertex of the conical portion on the incident surface is located in a beam center and providing the conical portion on the emergent surface similar to the incident surface, a light intensity distribution of the infrared light in the wavelength conversion element is equivalent to that of the fifth embodiment and similar effects can be obtained.

Since the number of used lenses can be reduced in this embodiment as compared with the fifth embodiment, there is an advantage of being able to reduce the cost more.

Seventh Embodiment

Figure 36:
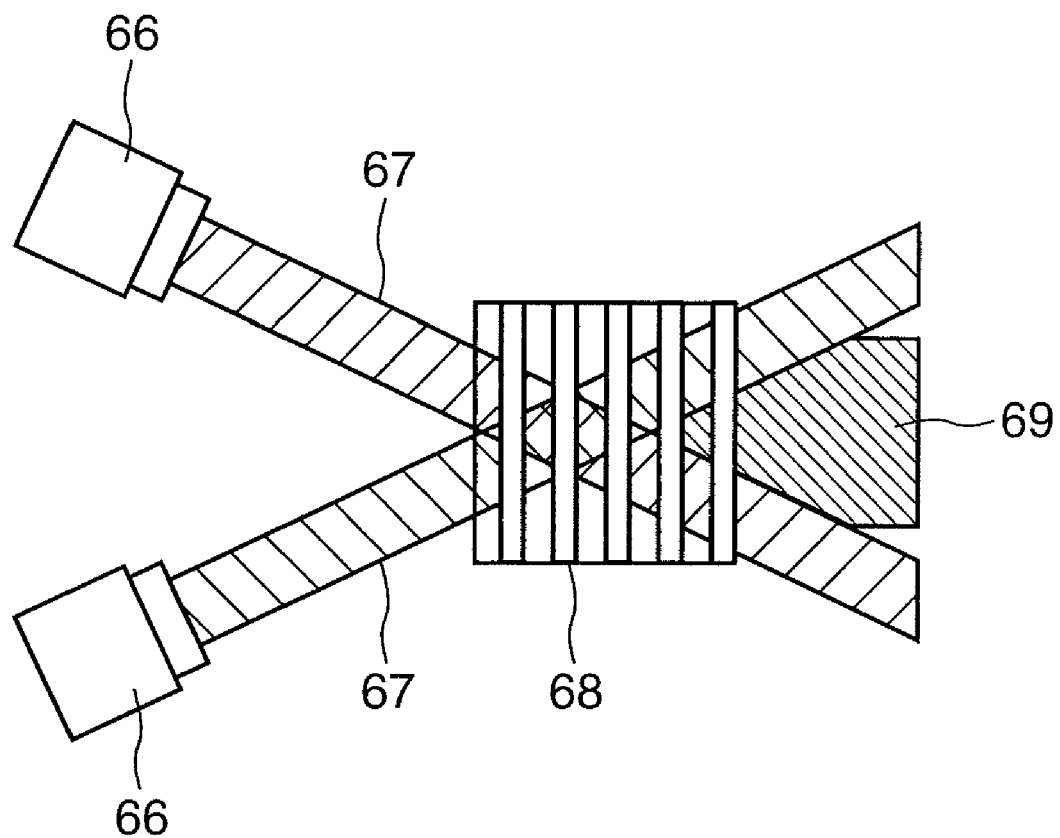
FIG. 36 is a schematic diagram showing a wavelength converter according to a seventh embodiment of the invention.

FIG. 36 is a schematic diagram showing a wavelength converter according to this embodiment. The wavelength converter according to this embodiment is provided with a pair of laser light sources 66 respectively capable of emitting laser light having a common wavelength and a wavelength conversion element 68 for converting infrared light 67 from these laser light sources 66 into green light 69.

The wavelength converter according to this embodiment is constructed such that the infrared light 67 from the respective infrared light sources 66 intersect in the wavelength conversion element 68. The green light 69 generated in a intersected section of the respective infrared light 67 propagates between the two infrared light 67. Since this enables the overlap of the infrared light 67 and the green light 69 in the second half of the element to be reduced, the generation of ultraviolet light as sum-frequency light of the infrared light 67 and the green light 69 in the wavelength conversion element 68 can be suppressed. Therefore, similar to the fifth and sixth embodiments, the output of the green light that can be generated without causing any crystal destruction can be increased.

In the wavelength converter according to this embodiment, by condensing the two infrared light 67 so that beam waists are located behind the overlapping position of the two infrared light 67, a high conversion efficiency is realized in the case of obtaining green light of about several W.

Similar to this embodiment, similar effects can be obtained in the case of using three or more laser light sources.

It is also possible to branch off infrared light emitted from one laser light source into infrared laser beams propagating in a plurality of optical paths using a prism or the like and intersect these optical paths in the wavelength conversion element. By doing so, similar effects can be obtained.

Eighth Embodiment

Figure 37:
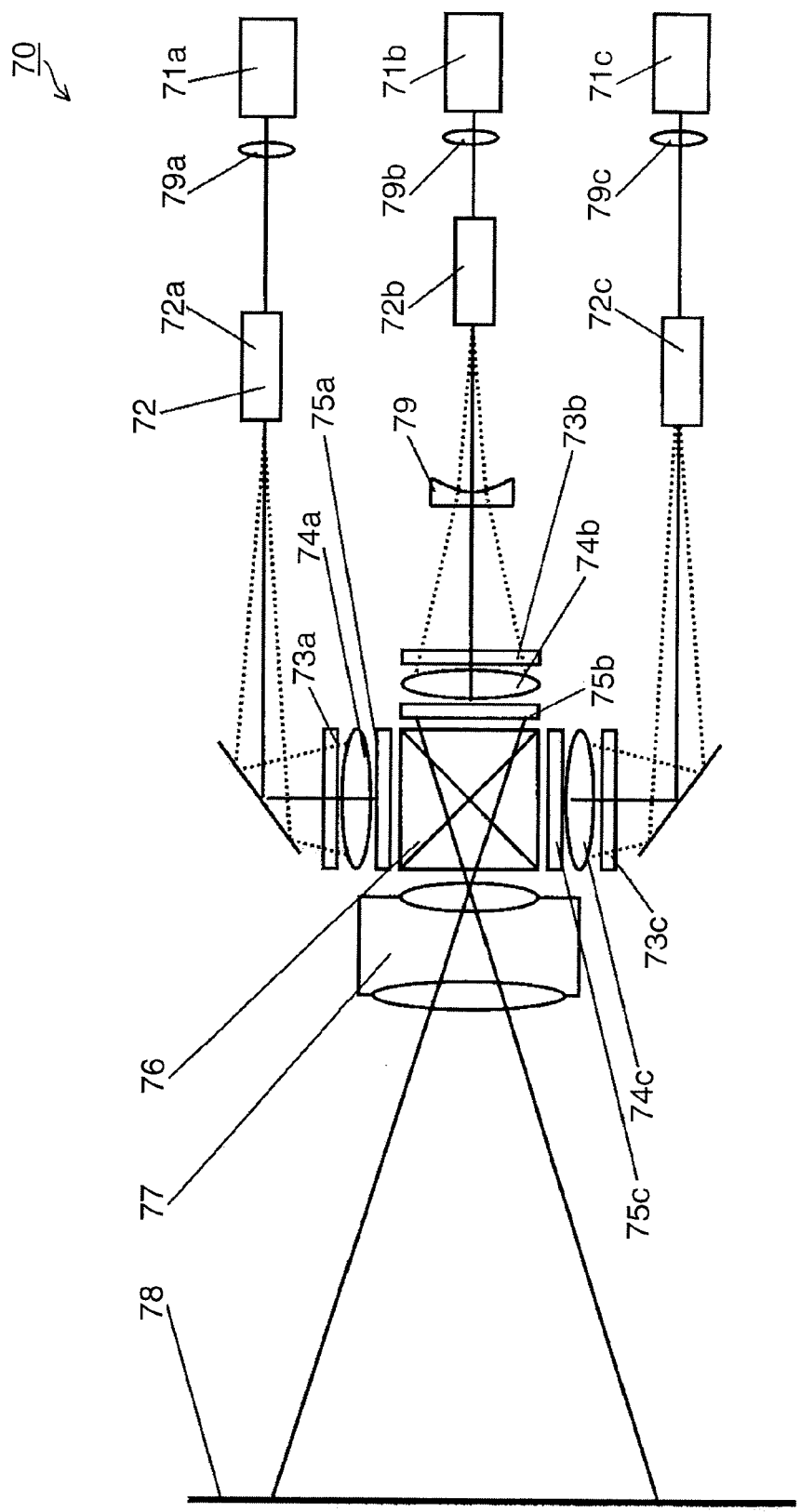
FIG. 37 is a diagram showing an example of a schematic construction of an image display according to an eighth embodiment of the invention.

FIG. 37 is a diagram showing an example of a schematic construction of an image display according to an eighth embodiment employing the wavelength converter shown in any one of the first to seventh embodiments. Laser light sources 71a, 71b and 71c of three colors, i.e. red (R), green (G) and blue (B) are used as light sources. A semiconductor laser made of an AlGaInP/GaAs material for emitting a light beam having a wavelength of 640 nm is used as the red laser light source (R light source) 71a. A semiconductor laser made of a GaN material for emitting a light beam having a wavelength of 450 nm is used as the blue laser light source (B light source) 71c. Further, a wavelength converter including a wavelength conversion element for halving the wavelength of infrared laser light and adapted to emit a laser beam having a wavelength of 530 nm is used as the green laser light source (G light source) 71b.

As shown in FIG. 37, an image display 70 of the eighth embodiment is provided with a plurality of laser light sources 71a, 71b and 71c and reflective two-dimensional beam scanners 72a, 72b and 72c for scanning laser beams emitted from the laser light sources 71a, 71b and 71c. The laser light sources 71a, 71b and 71c respectively emit at least red light (R light), green light (G light) and blue (light). Out of these laser light sources 71a, 71b and 71c, the laser light source 71b for emitting at least green light is formed using the wavelength converter shown in any one of the first to seventh embodiment described above.

Next, the construction of an optical system for forming an image using the laser light sources of the image display 70 of the eighth embodiment is described. Laser beams emitted from the respective RGB laser light sources 71a, 71b and 71c of the image display 70 are directed by the reflective two-dimensional beam scanners 72a, 72b and 72c to scan diffusing plates 73a, 73b and 73c after being condensed by condenser lenses 79a, 79b and 79c.

The laser beams diffused by the diffusing plates 73a, 73b and 73c are narrowed by field lenses 74a, 74b and 74c to be incident on spatial modulation elements 75a, 75b and 75c. Image data is divided into R, G and B data, and the respective data are inputted to the spatial modulation elements 75a, 75b and 75c. The laser beams modulated by the spatial modulation elements 75a, 75b and 75c are combined by a dichroic prism 76 to form a color image. The color image combined in this way is projected on a screen 78 by a projection lens 77. A concave lens 79 for making the spot size of G light in the spatial modulation element 75b equal to those of R light and B light is inserted in an optical path from the G light source 71b to the spatial modulation element 75b.

By using the wavelength converter shown in any one of the first to seventh embodiments of the present invention as the laser light source in the image display 70 of the eighth embodiment in this way, crystal destruction of the wavelength conversion element can be suppressed also in the case of obtaining high-output green light as compared with the case where an ordinary semiconductor laser is used.

Ninth Embodiment

Figure 38:
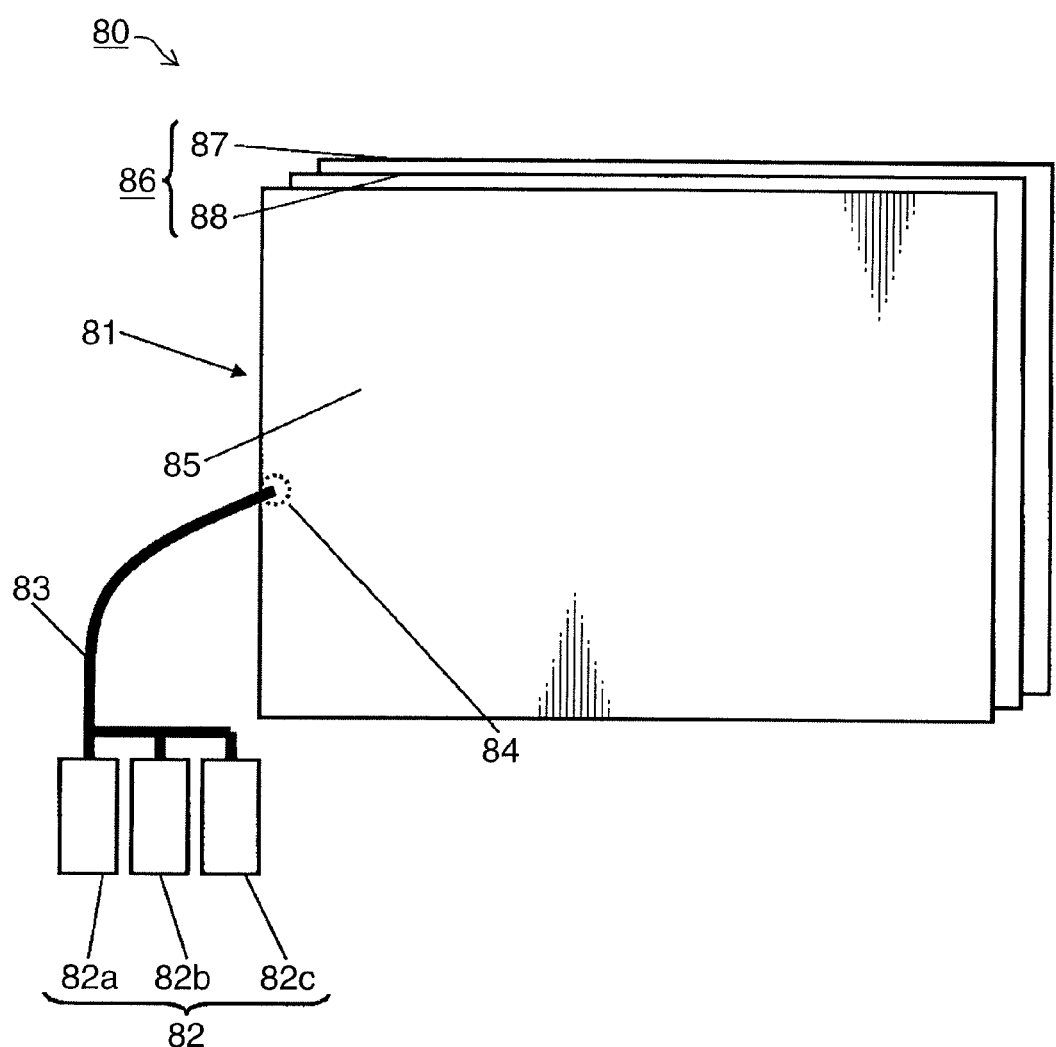
FIG. 38 is a diagram showing an example of a schematic construction of an image display according to a ninth embodiment of the invention.

FIG. 38 is a diagram showing an example of a schematic construction of an image display according to a ninth embodiment employing a backlight lighting device including semiconductor lasers shown in the first to seventh embodiments. FIG. 38 is a schematic construction diagram of a liquid crystal display 80 as an example of such an image display.

As shown in FIG. 38, the liquid crystal display 80 is provided with a liquid crystal display panel 86 and a backlight lighting device 81 for lighting the liquid crystal display panel 86 from behind. The backlight lighting device 81 includes a plurality of laser light sources 82, which include light sources for emitting at least red, green and blue light. In other words, the plurality of laser light sources 82 include a red laser light source (R light source) 82a for emitting red laser light, a green laser light source (G light source) 82b for emitting green laser light and a blue laser light source (B light source) 82c for emitting blue laser light. Out of the plurality of laser light sources 82, at least the G light source 82b is formed by using the wave length converter shown in any one of the first to seventh embodiments described above.

Here, a semiconductor laser made of an AlGaInP/GaAs material for emitting red light having a wavelength of 640 nm is used as the R light source 82a. A semiconductor laser made of a GaN material for emitting blue light having a wavelength of 450 nm is used as the B light source 82c. Further, a wavelength converter including a wavelength conversion element for halving the wavelength of infrared laser light and adapted to emit a laser beam having a wavelength of 530 nm is used as the G light source 82b.

Next, the construction of the liquid crystal display 80 of the ninth embodiment is further described. The liquid crystal display panel 86 includes a polarizing plate 87 for displaying an image using the respective R, G and B laser light emitted from the backlight lighting device 81, and a liquid crystal panel 88. The backlight lighting device 81 of the ninth embodiment shown in FIG. 38 includes the plurality of laser light sources 82, an optical fiber 83 for combining the R, G and B laser light from the plurality of laser light sources 82 and introducing them to a light guide plate 85 via a light guide portion 84, and the light guide plate 85 for emitting laser light from a principal surface (not shown) uniformly filled with the R, G and B light introduced from the light guiding portion 84.

By using the wavelength converter shown in any one of the first to ninth embodiments of the present invention as the laser light source of the backlight lighting device 81 in the liquid crystal display 80 of the ninth embodiment in this way, crystal destruction of the wavelength conversion element can be suppressed also in the case of obtaining high-output green light as compared with the case where an ordinary semiconductor laser is used.

The above specific embodiments mainly embrace inventions having the following constructions.

A laser wavelength converter according to one aspect of the present invention comprises a laser light source for emitting laser light; and a wavelength conversion element for wavelength converting laser light from the laser light source, wherein the wavelength conversion element has an optimal condensing condition for maximizing a conversion efficiency for the laser light, and the laser light is so incident on the wavelength conversion element as to attain a reduced condensing condition on which the conversion efficiency is reduced from that on the optimal condensing condition.

According to the present invention, upon obtaining a harmonic by causing laser light as a fundamental wave to be incident on the wavelength conversion element, the generation of sum-frequency light of the fundamental wave and the harmonic can be suppressed and, thereby, the destruction of the wavelength conversion element can be suppressed since the conversion efficiency is lower on the reduced condensing condition than on the optimal condensing condition.

In other words, when the sum-frequency light of the fundamental wave and the harmonic was generated in the wavelength conversion element, a phenomenon of absorbing the harmonic by this sum-frequency light and heating the wavelength conversion element in this absorbed part to destruct the wavelength conversion element was confirmed. Since the conversion efficiency by the wavelength conversion element can be reduced in the present invention by a deviation of the condensing condition of the laser light from the optimal condensing condition, the heat generation of the wavelength conversion element can be suppressed by reducing the generation efficiency of the sum-frequency light.

The heat generation of the wavelength conversion element caused by two-photon absorption of the harmonic is thought to be a cause of the destruction of the wavelength conversion element. However, since the condensing condition of the laser light is set to differ from the optimal condensing condition in the present invention, it is also possible to suppress the heat generation of the wavelength conversion element by reducing the light intensity of the harmonic.

Thus, according to the present invention, a high-output harmonic can be obtained while the destruction of the wavelength conversion element is suppressed.

In the above laser wavelength converter, it is preferable that a condensing member for condensing the laser light is further provided; and that the condensing member condenses the laser light at a position different from an optimal position where the conversion efficiency is maximized in a length direction of the wavelength conversion element parallel with an optical axis direction of the laser light.

According to this construction, it can be made to fail to satisfy the optimal condensing condition by adjusting the condensed position of the laser light in the optical axis direction of the laser light.

Specifically, it is preferable that at least a part of the wavelength conversion element is formed with a polarization-reversed phase-matched to the laser light; and that the condensing member condenses the laser light at a position closer to the laser light source than to a longitudinal central position of the polarization-reversed structure.

According to this construction, since an optical path after the condensed position can be made longer than an optical path before the condensed position in the optical path of the laser light in the wavelength conversion element, the harmonic to be absorbed by the sum-frequency light generated in the wavelength conversion element can be reduced, with the result that the heat generation of the wavelength conversion element can be more effectively suppressed.

Specifically, the light intensity of the sum-frequency light maximizes in a range slightly after the condensed position, whereas the light intensity of the laser light per unit area decreases with distance from the condensed position. Since the condensed position is set before the central position of the polarization-reversed structure in the above construction, the light intensity of the laser light in the range after the condensed position can be drastically reduced as compared with the case where the condensed position of the laser light is set at the central position of the polarization-reversed structure. As a result, the overlap of the sum-frequency light and the harmonic can be more reliably suppressed and the absorption of the harmonic by the sum-frequency light can be drastically reduced.

In the above laser wavelength converter, the condensing member preferably condenses the laser light at such an inner position of the wavelength conversion element that a distance from an incident end of the polarization-reversed structure is 40% or less of a dimension of the polarization-reversed structure in the length direction.

According to this construction, the output of the harmonic can be increased by 10% or more as compared with the case where the condensed position of the laser light is set at the central position of the polarization-reversed structure.

In the above laser wavelength converter, the condensing member preferably condenses the laser light at such an inner position of the wavelength conversion element that a distance from an incident end of the polarization-reversed structure is 25% or less of the dimension of the polarization-reversed structure in the length direction.

According to this construction, the output of the harmonic can be increased by 30% or more as compared with the case where the condensed position of the laser light is set at the central position of the polarization-reversed structure.

In the above laser wavelength converter, the condensing member preferably condenses the laser light near an incident end surface of the polarization-reversed structure.

According to this construction, the light intensity of the laser light per unit area maximizes near the end surface of the polarization-reversed structure and the light intensity decreases with distance toward an emergent side in the polarization-reversed structure. Thus, the overlap of the sum-frequency light and the harmonic can be more reliably suppressed.

In the above laser wavelength converter, the condensing member preferably condenses the laser light at a position closer to the laser light source than to the incident end surface of the polarization-reversed structure.

Also in this construction, the light intensity of the laser light per unit area in the polarization-reversed structure decreases with distance toward the emergent side. Thus, the overlap of the sum-frequency light and the harmonic can be more reliably suppressed.

For example, if the wavelength conversion element is formed with a projecting part extending from the incident end surface of the polarization-reversed structure toward the laser light source and the projecting part is not formed with the polarization-reversed structure, the condensed position of the laser light can be set in the projecting part.

In the above laser wavelength converter, the condensing member preferably has an NA which is 1.5 times as high as an NA for satisfying the optimal condensing condition.

According to this construction, the light intensity of the sum-frequency light generated in the range after the condensed position of the laser light can be drastically reduced. Specifically, in the case of obtaining green light using infrared light as a fundamental wave, the light intensity of ultraviolet light generated as sum-frequency light can be reduced by about 45% if the NA that is 1.5 times as high as the NA on the optimal condensing condition is used.

In the above laser wavelength converter, it is preferable that the condensing member condenses the laser light in a substantially elliptical range; and that the length of a major axis of the substantially elliptical shape is set to 1.1 times or more as long as that of a minor axis.

According to this construction, a high-output harmonic can be obtained effectively utilizing a limited space in the wavelength conversion element by aligning the major axis of the elliptical shape with a width direction and the minor axis thereof with a thickness direction also in the wavelength conversion element having a relatively large width and a limited small thickness. Specifically, by setting the length of the major axis to 1.1 times as long as that of the minor axis, a cross-sectional area can also be increased by about 10% as compared with a circle having a radius equal to the length of the minor axis. Therefore, a harmonic output can also be increased by about 10%.

In the above laser wavelength converter, the condensing member preferably condenses the laser light with an astigmatic difference.

According to this construction, since the concentration of the light intensity of the laser light at one position can be suppressed, the light intensities of the sum-frequency light and harmonic generated in the wavelength conversion element can be reduced, whereby the destruction of the wavelength conversion element can be suppressed.

In the above laser wavelength converter, the laser light source is so formed as to emit laser light whose maximum light intensity in a beam cross section is set to 0.9-fold or less of the light intensity of a Gaussian beam which satisfies an optimal condensing condition at the same output.

According to this construction, the light intensities of the sum-frequency light and harmonic generated in the wavelength conversion element can be reduced by reducing the maximum light intensity of the laser light in the beam cross section, whereby the harmonic output can be increased while the destruction of the wavelength conversion element is suppressed.

Specifically, since the maximum light intensity is set to 0.9-fold of the light intensity of the Gaussian beam, the light intensity of the harmonic that serves as a threshold value for the destruction of the wavelength conversion element can be increased by about 10% as compared with the case where the Gaussian beam is incident on the wavelength conversion element.

Although it is not meant to limit the structure of the wavelength conversion element, a bulk-type wavelength conversion element can be employed as the wavelength conversion element.

In the above laser wavelength converter, M2 of the laser light is preferably larger than 1.2.

According to this construction, since M2 is set not to 1.0 for satisfying the optimal condensing condition, but to 1.2, the beam diameter of the laser light at the condensed position can be increased with the NA kept constant. Since the absorption amount of the harmonic by the sum-frequency light decreases as the beam diameter of the laser light at the condensed position increases, the destruction of the wavelength conversion element can be more effectively suppressed by employing the above construction.

In the above laser wavelength converter, it is preferable that a plurality of wavelength conversion elements are provided; and that the condensing condition of the laser light is set to the reduced condensing condition in at least one of the respective wavelength conversion elements.

According to this construction, a high-output harmonic can be obtained utilizing the plurality of wavelength conversion elements while the destruction of the at least one wavelength conversion element is suppressed. For example, in this construction, green light of higher than 5 W can be generated with a high efficiency using two wavelength conversion elements.

In the above laser wavelength converter, it is preferable that a plurality of optical paths of the laser light are set in the wavelength conversion element; and that the condensing condition of the laser light is set to the reduced condensing condition in at least one of the respective optical paths.

According to this construction, a high-output harmonic can be obtained utilizing the plurality of optical paths while the heat generation of the wavelength conversion element is suppressed in at least one of the plurality of optical paths set in the common wavelength conversion element. For example, in this construction, green light of higher than 5 W can be generated with a high efficiency using two optical paths.

In the above laser wavelength converter, it is preferable that two reflecting mirrors are further arranged at the opposite sides of the wavelength conversion element; that the plurality of optical paths are set between the respective reflecting mirrors; and that at least one of the reflecting mirrors is formed to reflect the laser light while condensing it.

According to this construction, a wavelength conversion by the wavelength conversion element can be performed a plurality of times by repeatedly reflecting the laser light between the two reflecting mirrors. In addition, since at least one of the respective reflecting mirrors is formed to condense the laser light, the destruction of the wavelength conversion element can be suppressed by setting a condensing condition by this reflecting mirror to differ from the optimal condensing condition.

In the above laser wavelength converter, the laser light source preferably emits the laser light in the form of radiation light to be incident on the wavelength conversion element.

According to this construction, upon obtaining a harmonic by causing the laser light as a fundamental wave to be incident on the wavelength conversion element, the laser light is directly incident on the wavelength conversion element without via any condensing member. Thus, the generation of sum-frequency light of the fundamental wave and the harmonic can be suppressed, whereby the destruction of the wavelength conversion element can be suppressed.

Specifically, when the sum-frequency light of the fundamental wave and the harmonic was generated in the wavelength conversion element, a phenomenon of absorbing the harmonic by this sum-frequency light and heating the wavelength conversion element in this absorbed part to destruct the wavelength conversion element was confirmed. In the present invention, since the laser light in the form of divergent light is incident on the wavelength conversion element, the light intensity of the fundamental wave is highest at an incident position on the wavelength conversion element and the light intensity of the sum-frequency light is highest near this position. On the other hand, the light intensity of the laser light in the form of divergent light decreases as the laser light propagates in the wavelength conversion element, wherefore the overlap of the sum-frequency light and the harmonic can be suppressed and the absorption of the fundamental wave by the sum-frequency light can be drastically reduced.

Thus, according to the present invention, a high-output harmonic can be obtained while the destruction of the wavelength conversion element is suppressed.

Specifically, the laser light source and the wavelength conversion element can be directly bonded.

In the above laser wavelength converter, the reduced condensing condition of the laser light is preferably set so that the light intensity of the laser light distributes at a plurality of positions in the range after the condensed position of the laser light.

According to this construction, since the light intensity of the laser light in the range after the condensed position can be distributed at the plurality of positions, the overlap of the laser light as the fundamental wave with the sum-frequency light whose intensity is highest near the condensed position can be suppressed. Thus, the heat generation of the wavelength conversion element due to the absorption of the harmonic by the sum-frequency light can be suppressed and the destruction of the wavelength conversion element can be effectively suppressed.

In the above laser wavelength converter, it is preferable to further comprise a distribution member provided between the laser light source and the wavelength conversion element for distributing the light intensity of the laser light in a doughnut shape.

According to this construction, the overlap of the sum-frequency light and the laser light in the range after the condensed position can be suppressed by forming the laser light to have a doughnut shape.

In the above laser wavelength converter, the wavelength conversion element may include a conical incident portion projecting toward the laser light source; and the incident portion is formed so that the light intensity of the laser light incident on the wavelength conversion element via the incident portion is distributed in a doughnut shape and the laser light is condensed in the wavelength conversion element. By doing so, the laser light can be condensed without providing any condensing member and can be distributed in a doughnut shape, wherefore a cost reduction can be realized.

In the above laser wavelength converter, a plurality of laser light sources may be provided, the respective laser light sources can respectively emit laser light having a common wavelength and optical paths of the respective laser may light intersect with each other in the wavelength conversion element.

According to this construction, the laser light emitted from the plurality of laser light sources can be condensed in the wavelength conversion element, and the optical paths of the respective laser light extend in different directions in the range after the position of intersection (condensed position). Therefore, the overlap of the sum-frequency light generated in the wavelength conversion element and the laser light can be suppressed.

In the above laser wavelength converter, it is preferable to further comprise a branching member for branching the laser light emitted from the laser light source into a plurality of laser light.

According to this construction, the laser light can be condensed in the wavelength conversion element and the optical paths of the respective laser light extend in different directions in the range after the position of intersection (condensed position), for example, by branching the laser light emitted from one laser light source in a plurality of optical paths using the branching member and providing an optical system for adjusting the respective optical paths so that the optical paths of the respective laser light intersect in the wavelength conversion element. Therefore, the overlap of the sum-frequency light generated in the wavelength conversion element and the laser light can be suppressed.

In the above laser wavelength converter, it is preferable that at least a part of the wavelength conversion element is formed with a polarization-reversed structure for wavelength converting the laser light; and that a reduced condensed position of the laser light is set at a position closer to the laser light source than to a central position of the polarization-reversed structure in a length direction of the wavelength conversion element from an incident end surface for the laser light to an emergent end surface for the harmonic.

According to this construction, since the optical path after the condensed position of the laser light can be made longer than the optical path before the condensed position in the optical path of the laser light in the wavelength conversion element, the amount of the laser light absorbed by the sum-frequency light generated in the wavelength conversion element can be reduced, with the result that the calorific value of the wavelength conversion element can be more effectively suppressed.

Specifically, the light intensity of the sum-frequency light maximizes in a range slightly after the condensed position, whereas the light intensity of the laser light per unit area decreases with distance from the condensed position. Since the condensed position is set before the central position of the polarization-reversed structure in this construction, the light intensity of the laser light in the range after the condensed position can be drastically reduced as compared with the case where the condensed position of the laser light is set at the central position of the polarization-reversed structure. As a result, the overlap of the sum-frequency light and the laser light can be more reliably suppressed and the absorption of the harmonic by the sum-frequency light can be drastically reduced.

In the above laser wavelength converter, it is preferable to further comprise a temperature adjusting member capable of adjusting the temperature of the wavelength conversion element individually in a range near the condensed position of the laser light and a range after the condensed position.

According to this construction, the wavelength conversion efficiency can be more improved since the temperature of the wavelength conversion element can be individually adjusted in the range near the condensed position and that after the condensed position.

Specifically, if the harmonic is absorbed by the sum-frequency light in the range after the condensed position, the wavelength conversion element is heated and a phase matching condition of the polarization-reversed structure may be disturbed by the influence of this heat generation. However, in this construction, since the temperature of the wavelength conversion element can be adjusted for the range after the condensed position, a proper phase matching condition can be maintained. On the other hand, since the light intensity of the fundamental wave maximizes in the range near condensed position, the temperature of the wavelength conversion element can be suitably adjusted to a temperature suitable for a wavelength conversion.

In the above laser wavelength converter, the polarization-reversed structure is preferably set so that a polarization-reversal period is shorter in the range after the condensed position of the laser light than in the range near the condensed position.

According to this construction, the wavelength conversion efficiency can be improved since the period of the polarization-reversed structure can be set to a period suitable for the wavelength conversion for the range after the condensed position of the laser light. In other words, the phase matching period becomes shorter due to the inclination of the wave front of the laser light with respect to the polarization-reversed structure in the range after the condensed position. However, since the polarization reversal period is shortened for the range after the condensed position in this construction, the wavelength conversion can be efficiently performed.

In the above laser wavelength converter, the laser light source preferably emits the laser light by pulse oscillation.

According to this construction, since peak light intensity can be increased even in the case of a low average output as compared with the case where the laser light is emitted in the form of continuous light from the laser light source, the conversion efficiency of the harmonic can be improved. Thus, according to this construction, the output of the harmonic can be increased by the oscillation of a pulsed laser while the destruction of the wavelength conversion element is suppressed by setting the condensing condition of the laser light to differ from the optimal condensing condition.

In the above laser wavelength converter, a beam radius at the condensed position of the laser light can be 30 μm when the length of the wavelength conversion element is 30 mm and can be 25 μm when the length of the wavelength conversion element is 26 mm.

In the above laser wavelength converter, a wavelength conversion element in which a periodically polarization-reversed structure for quasi phase matching is formed in lithium niobate or lithium tantalate doped with magnesium oxide can be employed as the wavelength conversion element.

In the above laser wavelength converter, the harmonic can be generated to have an average output of 2 W or higher.

In the above laser wavelength converter, laser light having a wavelength of from 450 nm to 2200 nm can be caused to incident on the wavelength conversion element for the shortening of the wavelength.

In the above laser wavelength converter, a solid-state laser such as a YAG laser or a fiber laser using a fiber doped with a rare-earth element such as Yb or Nd can be used as the laser light source.

An image display according to another aspect of the present invention comprises a plurality of laser light sources; and an optical system for forming an image on the screen using the plurality of laser light sources, wherein the plurality of laser light sources include at least a red laser light source for emitting a red light beam, a green laser light source for emitting a green light beam and a blue laser light source for emitting a blue light beam; and at least the green one of the respective laser light sources includes the above laser wavelength converter.

An image display according to still another aspect of the present invention comprises a liquid crystal display panel and a backlight lighting device for lighting the liquid crystal display panel from behind, wherein the backlight lighting device includes at least a red laser light source for emitting a red light beam, a green laser light source for emitting a green light beam and a blue laser light source for emitting a blue light beam; and at least the green one of the respective laser light sources includes the above laser wavelength converter.

INDUSTRIAL APPLICABILITY

By using a construction according to the present invention, it is possible to obtain a high-output second harmonic with a high efficiency from a nonlinear crystal with a polarization-reversed structure. Further, in the case of outputting a green second harmonic, a compact green laser light source can be realized. Thus, the present invention is useful to backlights of liquid crystal televisions, projection televisions, projectors and the like which are required to include compact and high-output laser light sources.

What is claimed is:

1. A laser wavelength converter, comprising:
 a laser light source for emitting laser light;
 a wavelength conversion element for wavelength converting laser light from the laser light source; and
 a condensing member for condensing the laser light, wherein:
 at least a part of the wavelength conversion element is formed with a polarization-reversed structure phase-matched to the laser light;
 the condensing member condenses the laser light at a position closer to the laser light source than to a central position of the polarization-reversed structure in a length direction of the wavelength conversion element parallel with an optical axis direction of the laser light; and
 the condensing member condenses the laser light at such an inner position of the wavelength conversion element that a distance from an incident end of the polarization-reversed structure is 40% or less of a dimension of the polarization-reversed structure in the length direction.

2. A laser wavelength converter according to claim 1, wherein the condensing member condenses the laser light at such an inner position of the wavelength conversion element that a distance from an incident end of the polarization-reversed structure is 25% or less of a dimension of the polarization-reversed structure in the length direction.

3. A laser wavelength converter according to claim 1, wherein the condensing member has an NA which is 1.5 times as high as an NA for maximizing a conversion efficiency for the laser light.

4. A laser wavelength converter according to claim 1, wherein:
 the condensing member condenses the laser light in a substantially elliptical range; and
 the length of a major axis of the substantially elliptical shape is set to 1.1 times or more as long as that of a minor axis.

5. A laser wavelength converter according to claim 1, wherein the condensing member condenses the laser light with an astigmatic difference.

6. A laser wavelength converter according to claim 1, wherein the laser light source is so formed as to emit laser light whose maximum light intensity in a beam cross section is set to 0.9-fold or less of the light intensity of a Gaussian beam which maximizes a conversion efficiency for the laser light at the same output.

7. A laser wavelength converter according to claim 1, wherein the wavelength conversion element is a bulk-type wavelength conversion element.

8. A laser wavelength converter according to claim 1, wherein M2 of the laser light is larger than 1.2.

9. A laser wavelength converter according to claim 1, wherein:
 a plurality of wavelength conversion elements are provided; and
 the condensing member condenses the laser light at such an inner position of the wavelength conversion element that a distance from an incident end of the polarization-reversed structure is 40% or less of a dimension of the polarization-reversed structure in the length direction, in at least one of the respective wavelength conversion elements.

10. A laser wavelength converter according to claim 1, wherein:
 a plurality of optical paths of the laser light are set in the wavelength conversion element; and
 the condensing member condenses the laser light at such an inner position of the wavelength conversion element that a distance from an incident end of the polarization-reversed structure is 40% or less of a dimension of the polarization-reversed structure in the length direction, in at least one of the respective optical paths.

11. A laser wavelength converter according to claim 10, further comprising two reflecting mirrors arranged at the opposite sides of the wavelength conversion element; wherein:
 the plurality of optical paths are set between the respective reflecting mirrors; and
 at least one of the reflecting mirrors is formed to reflect the laser light while condensing it.

12. A laser wavelength converter according to claim 1, wherein the laser light source emits the laser light in the form of radiation light to be incident on the wavelength conversion element.

13. A laser wavelength converter according to claim 12, wherein the laser light source and the wavelength conversion element are directly bonded.

14. A laser wavelength converter according to claim 1, wherein the light intensity of the laser light distributes at a plurality of positions in the range after the condensed position of the laser light.

15. A laser wavelength converter according to claim 14, further comprising a distribution member provided between the laser light source and the wavelength conversion element for distributing the light intensity of the laser light in a doughnut shape.

16. A laser wavelength converter according to claim 14, wherein:
 the wavelength conversion element includes a conical incident portion projecting toward the laser light source; and the incident portion is formed so that the light intensity of the laser light incident on the wavelength conversion element via the incident portion is distributed in a doughnut shape and the laser light is condensed in the wavelength conversion element.

17. A laser wavelength converter according to claim 14, wherein:
a plurality of laser light sources are provided;
the respective laser light sources can respectively emit laser light having a common wavelength; and
optical paths of the respective laser light intersect with each other in the wavelength conversion element.

18. A laser wavelength converter according to claim 14, further comprising a branching member for branching the laser light emitted from the laser light source into a plurality of laser light.

19. A laser wavelength converter according to claim 14, further comprising a temperature adjusting member capable of adjusting the temperature of the wavelength conversion element individually in a range near the condensed position of the laser light and a range after the condensed position.

20. A laser wavelength converter according to claim 14, wherein the polarization-reversed structure is set so that a polarization-reversal period is shorter in the range after the condensed position of the laser light than in the range near the condensed position.

21. A laser wavelength converter according to claim 1, wherein the laser light source emits the laser light by pulse oscillation.

22. An image display, comprising:
a plurality of laser light sources; and
an optical system for forming an image on a screen using the plurality of laser light sources,
wherein:
the plurality of laser light sources include at least a red laser light source for emitting a red light beam, a green laser light source for emitting a green light beam and a blue laser light source for emitting a blue light beam; and
at least the green one of the respective laser light sources includes the laser wavelength converter according to claim 1.

23. An image display, comprising:
a liquid crystal display panel; and
a backlight lighting device for lighting the liquid crystal display panel from behind,
wherein:
the backlight lighting device includes at least a red laser light source for emitting a red light beam, a green laser light source for emitting a green light beam and a blue laser light source for emitting a blue light beam; and
at least the green one of the respective laser light sources includes the laser wavelength converter according to claim 1.

24. A laser wavelength converter, comprising:
a laser light source for emitting laser light;
a wavelength conversion element for wavelength converting laser light from the laser light source; and
a condensing member for condensing the laser light,
wherein:
at least a part of the wavelength conversion element is formed with a polarization-reversed structure phase-matched to the laser light;
the condensing member condenses the laser light at a position closer to the laser light source than to an incident end surface of the polarization-reversed structure; and
the condensing member condenses the laser light with an astigmatic difference.

* * * * *